(12) United States Patent
Adachi

(10) Patent No.: US 8,917,758 B2
(45) Date of Patent: Dec. 23, 2014

(54) COMMUNICATION DEVICE, COMMUNICATION CONTROL METHOD AND A COMPUTER-READABLE STORAGE MEDIUM

(75) Inventor: Takahiro Adachi, Tokyo (JP)

(73) Assignee: NEC Corporation, Tokyo (JP)

( * ) Notice: Subject to any disclaimer, the term of this patent is extended or adjusted under 35 U.S.C. 154(b) by 203 days.

(21) Appl. No.: 13/394,763

(22) PCT Filed: Sep. 14, 2010

(86) PCT No.: PCT/JP2010/066266
§ 371 (c)(1),
(2), (4) Date: Mar. 7, 2012

(87) PCT Pub. No.: WO2011/034193
PCT Pub. Date: Mar. 24, 2011

(65) Prior Publication Data
US 2012/0170626 A1 Jul. 5, 2012

(30) Foreign Application Priority Data

Sep. 16, 2009 (JP) ................................ 2009-214086

(51) Int. Cl.
*H04B 1/38* (2006.01)
*H04L 5/16* (2006.01)
*H04L 27/00* (2006.01)
*H04W 52/12* (2009.01)
*H04W 52/08* (2009.01)

(52) U.S. Cl.
CPC ........... *H04W 52/12* (2013.01); *H04L 27/0008* (2013.01); *H04W 52/08* (2013.01)
USPC .................. 375/219; 455/73; 710/1

(58) Field of Classification Search
USPC ........................................................ 375/219
See application file for complete search history.

(56) References Cited

U.S. PATENT DOCUMENTS 6,751,187 B2 * 6/2004 Walton et al. ................. 370/210
8,014,454 B2    9/2011 Yoshii
(Continued)

FOREIGN PATENT DOCUMENTS

JP      10-041876       2/1998
JP      2004-072666     3/2004
(Continued)

OTHER PUBLICATIONS

International Search Report, PCT/JP2010/066266, Dec. 21, 2010.
(Continued)

*Primary Examiner* — Shuwang Liu
*Assistant Examiner* — Gina McKie
(74) *Attorney, Agent, or Firm* — Young & Thompson

(57) ABSTRACT

A communication device includes: a reception element for receiving a signal treated with a setting of a modulation scheme based on a modulation scheme designation information and a controlling of a transmission power based on the transmission power designation information by an external transmitter, demodulating the received signal based on a modulation scheme control information, and outputting a received data; a reception level measurement element for measuring a signal level of the signal and outputting the reception level; a designation information output element for outputting the transmission power designation information correlated to the modulation scheme designation information and the modulation scheme based on the reception level; and a transmission element for transmitting the modulation scheme designation information and the transmission power designation information for the transmitter.

18 Claims, 30 Drawing Sheets

(56) References Cited

U.S. PATENT DOCUMENTS

2005/0185727 A1* 8/2005 Tanaka et al. ............. 375/261
2008/0032726 A1* 2/2008 Tajima et al. ............. 455/509
2009/0305735 A1 12/2009 Sasaki et al.

FOREIGN PATENT DOCUMENTS

| JP | 2005-236709 | 9/2005 |
|---|---|---|
| JP | 2006-211096 | 8/2006 |
| JP | 2007-221357 | 8/2007 |
| WO | 2005-018125 | 2/2005 |
| WO | WO 2007/138796 | 12/2007 |

OTHER PUBLICATIONS

Japanese Office Action dated Aug. 5, 2014, in corresponding Japanese Patent Application No. 2011-531992.

* cited by examiner

FIG.2

| RECEPTION LEVEL | MODULATION SCHEME | TARGET RECEPTION LEVEL |
|---|---|---|
| X < CHANGEOVER THRESHOLD VALUE (I-II) | I | TARGET RECEPTION LEVEL (I) |
| CHANGEOVER THRESHOLD VALUE (I-II) ≦ X < CHANGEOVER THRESHOLD VALUE (II-III) | II | TARGET RECEPTION LEVEL (II) |
| CHANGEOVER THRESHOLD VALUE (II-III) ≦ X | III | TARGET RECEPTION LEVEL (III) |

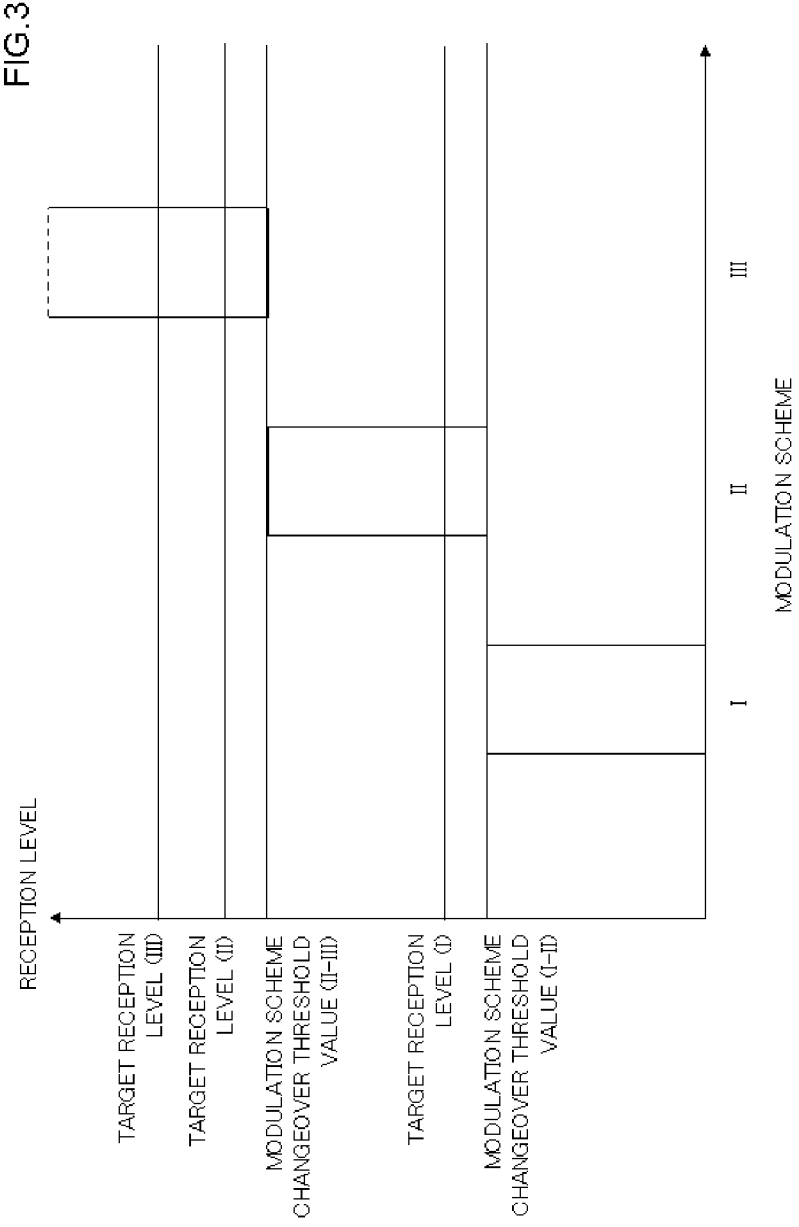

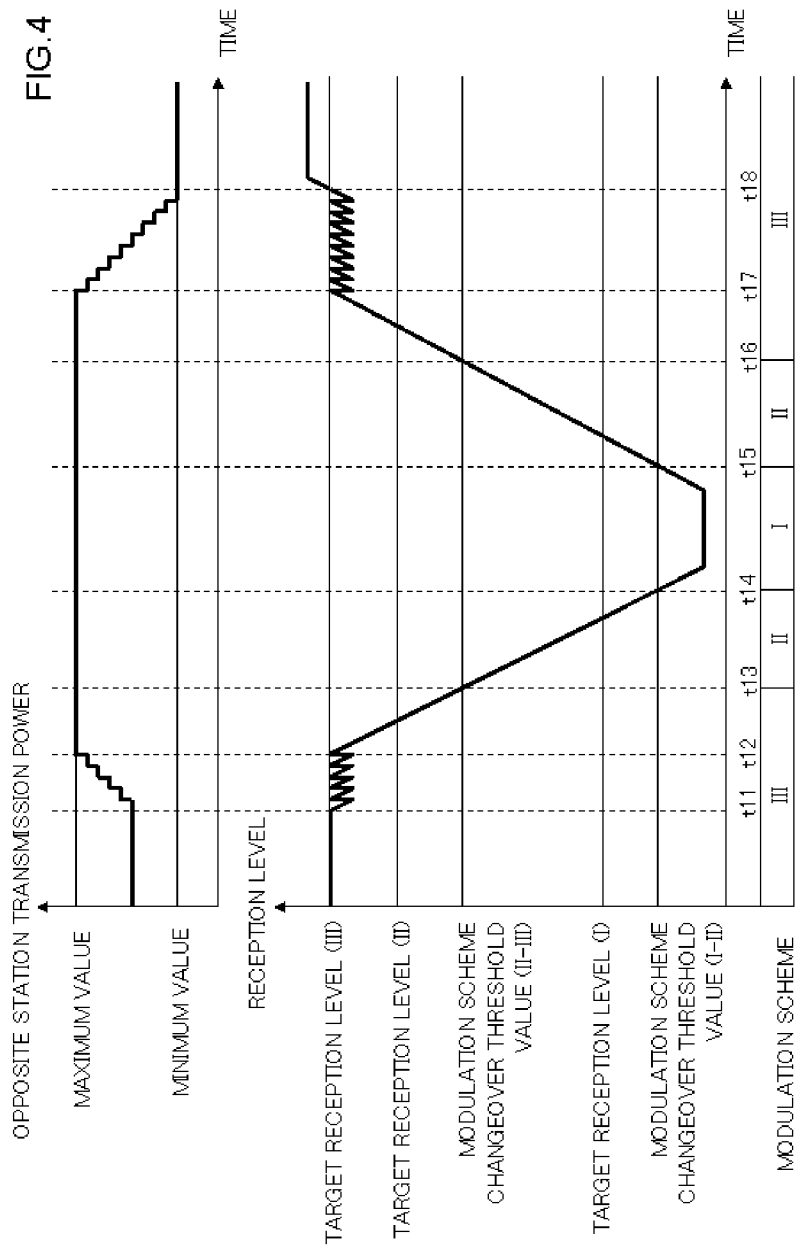

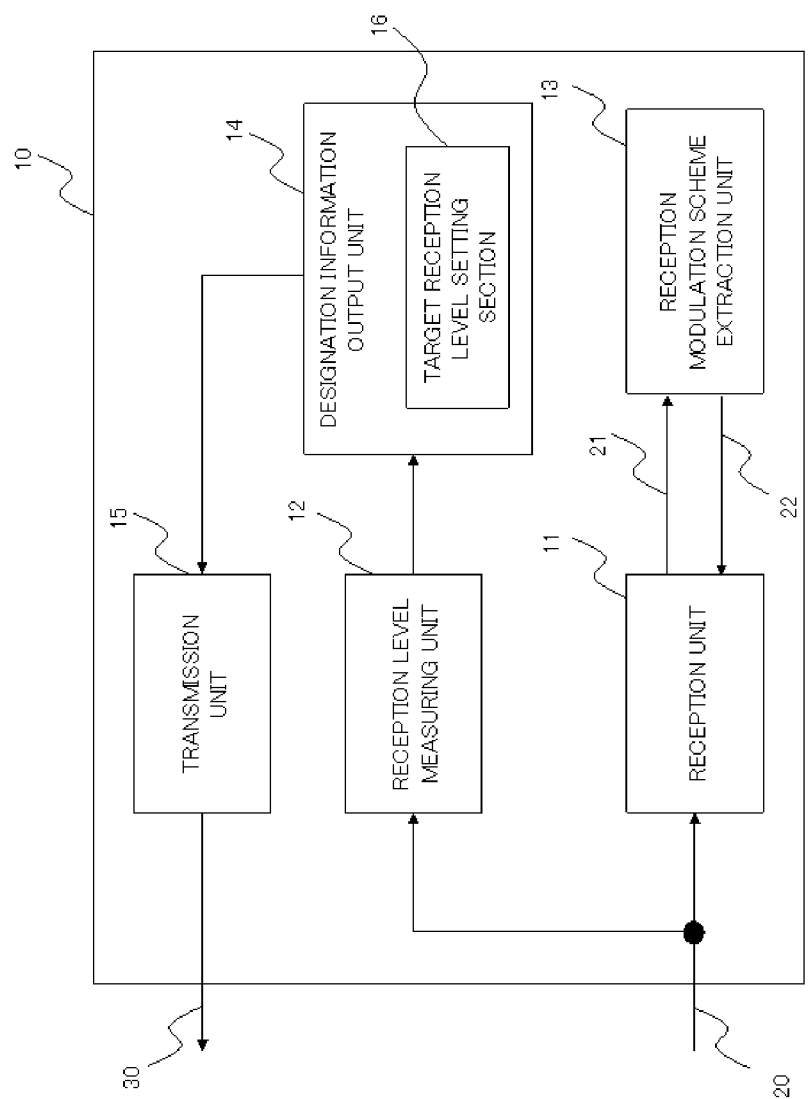

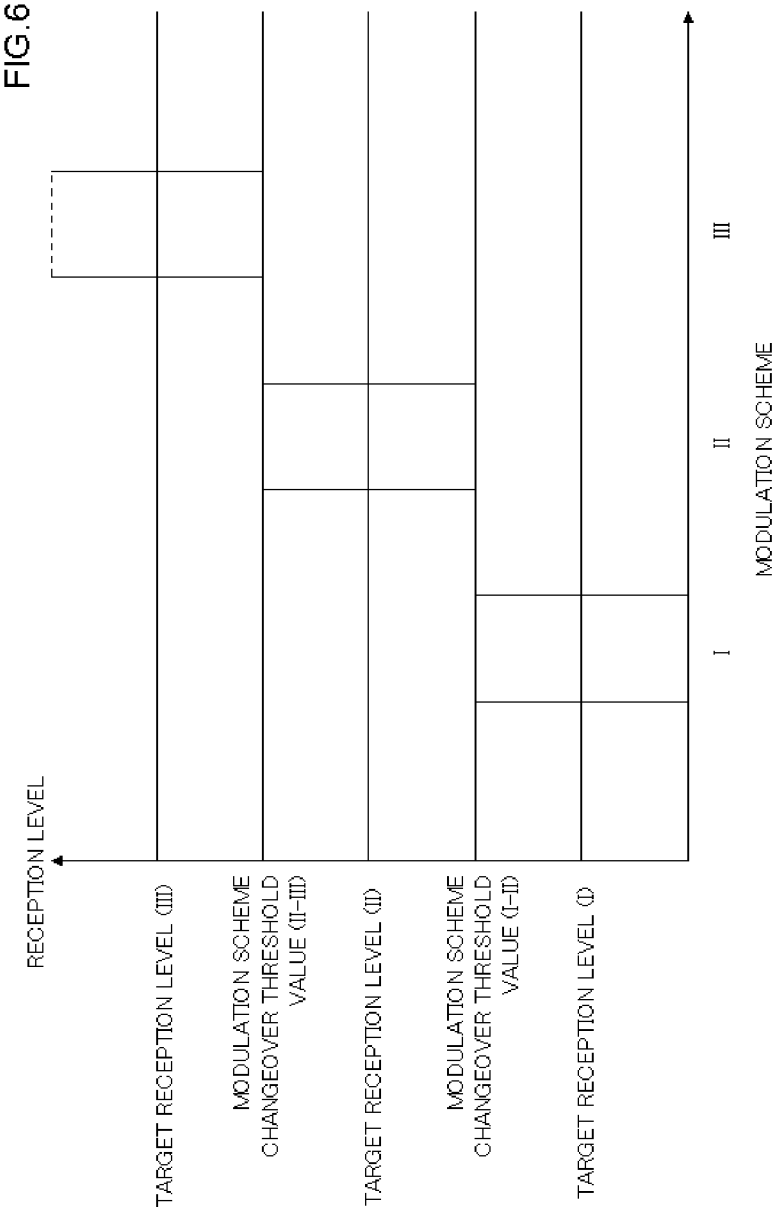

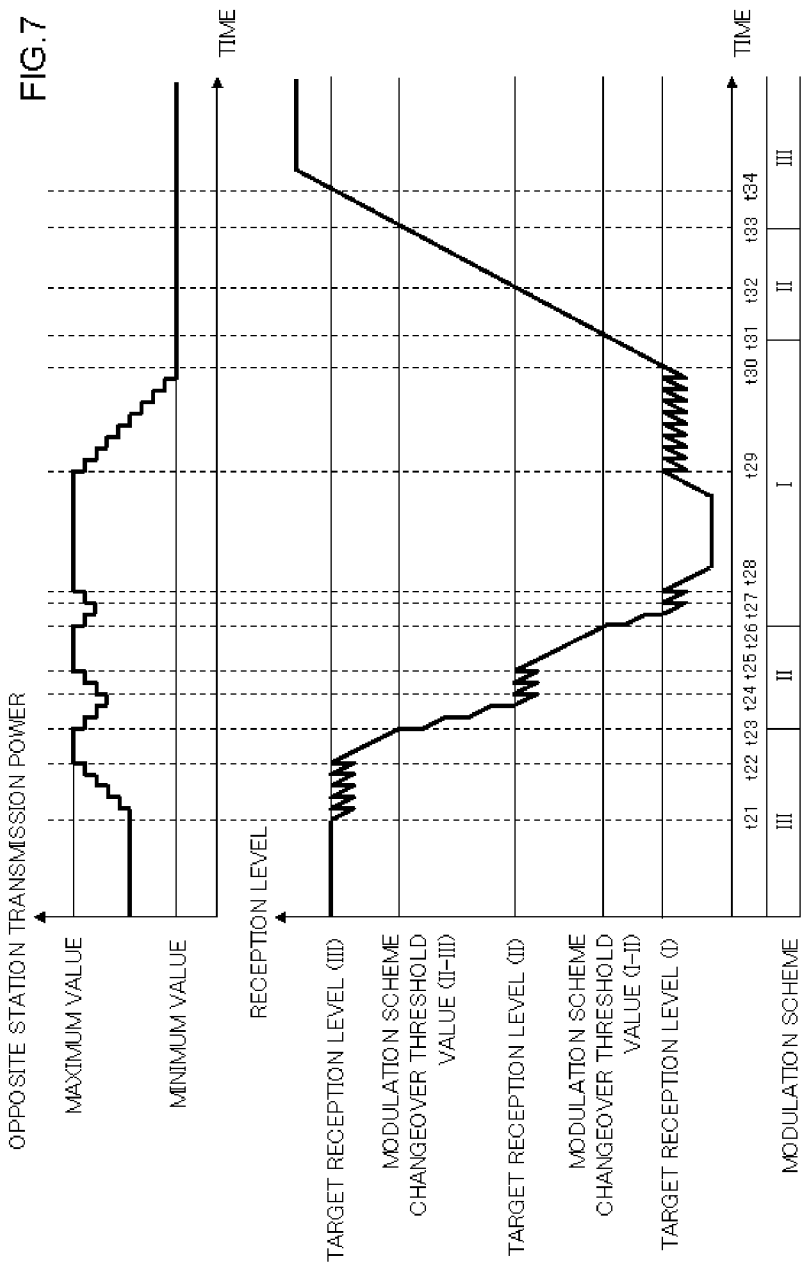

FIG.8

| RECEPTION LEVEL | MODULATION SCHEME | TARGET RECEPTION LEVEL (WHEN RECEPTION LEVEL IS GOING UP) | TARGET RECEPTION LEVEL (WHEN RECEPTION LEVEL IS GOING DOWN) |
|---|---|---|---|
| X < CHANGEOVER THRESHOLD VALUE (I-II) | I | TARGET RECEPTION LEVEL (I−) | TARGET RECEPTION LEVEL (I+) |
| CHANGEOVER THRESHOLD VALUE (I-II) ≦ X < CHANGEOVER THRESHOLD VALUE (II-III) | II | TARGET RECEPTION LEVEL (II−) | TARGET RECEPTION LEVEL (II+) |
| CHANGEOVER THRESHOLD VALUE (II-III) ≦ X | III | TARGET RECEPTION LEVEL (III) | TARGET RECEPTION LEVEL (III) |

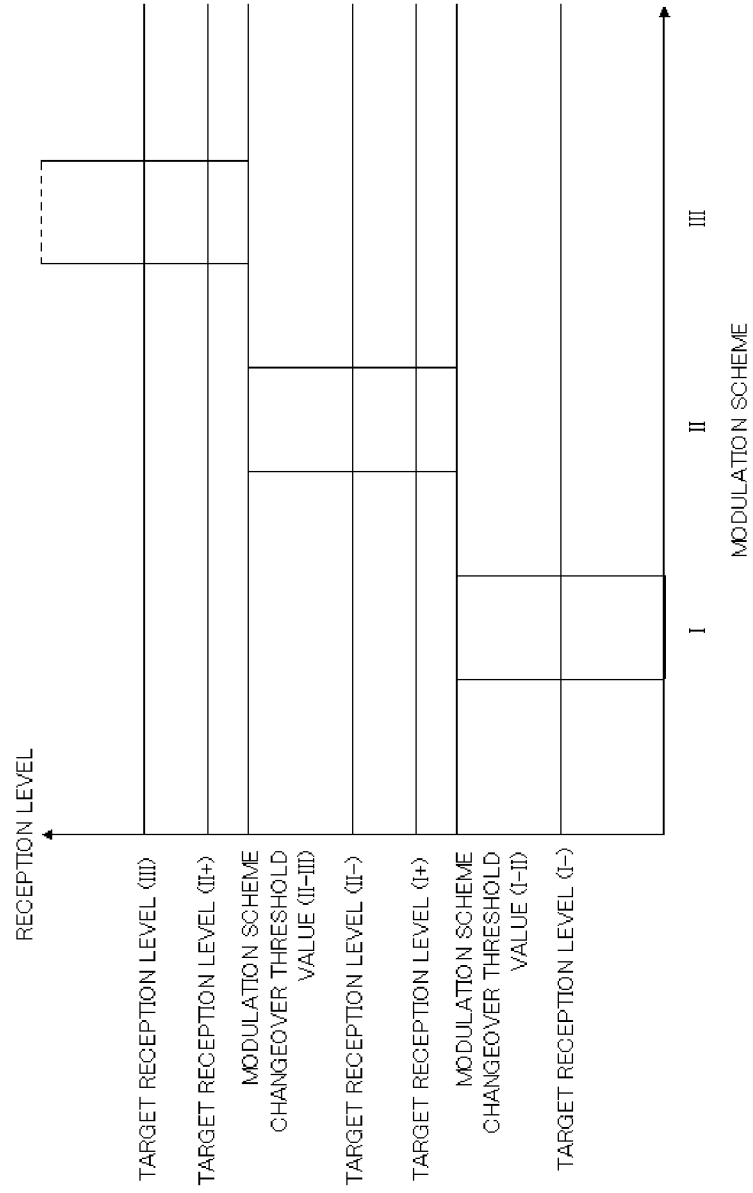

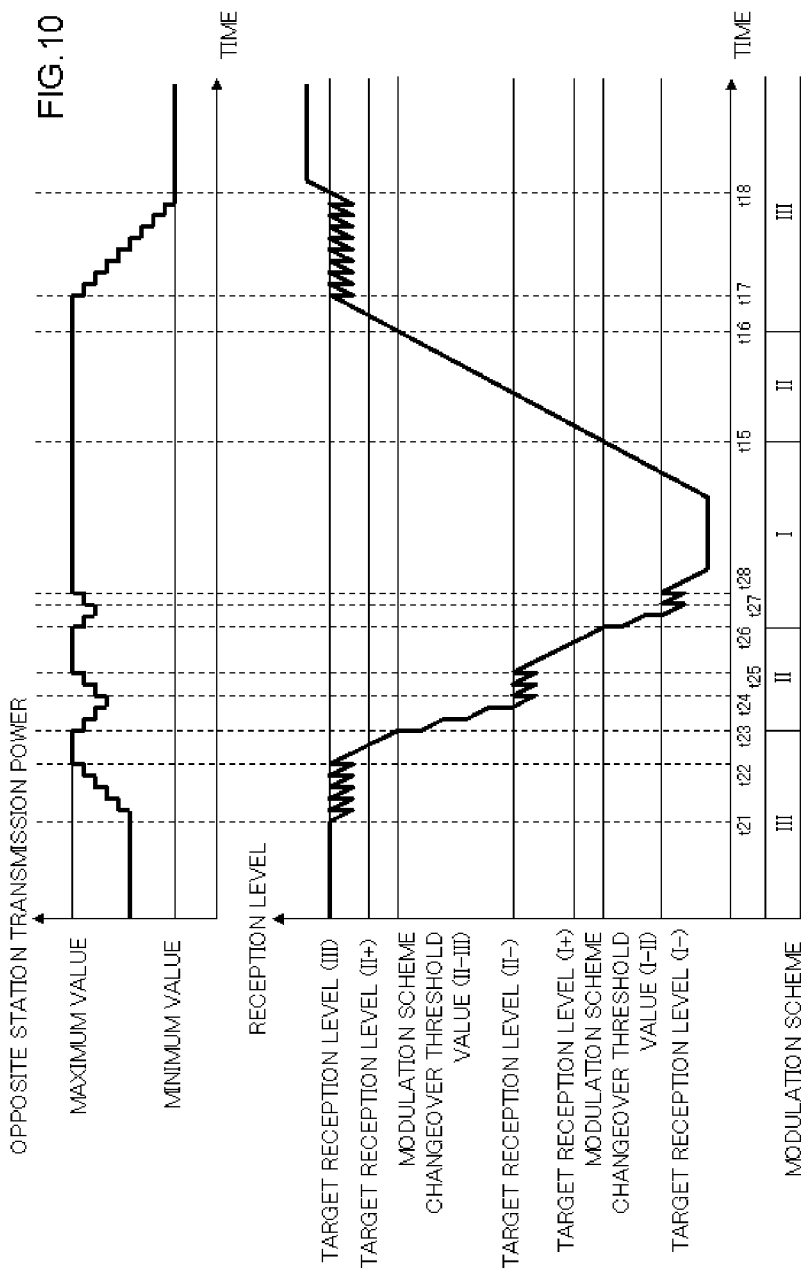

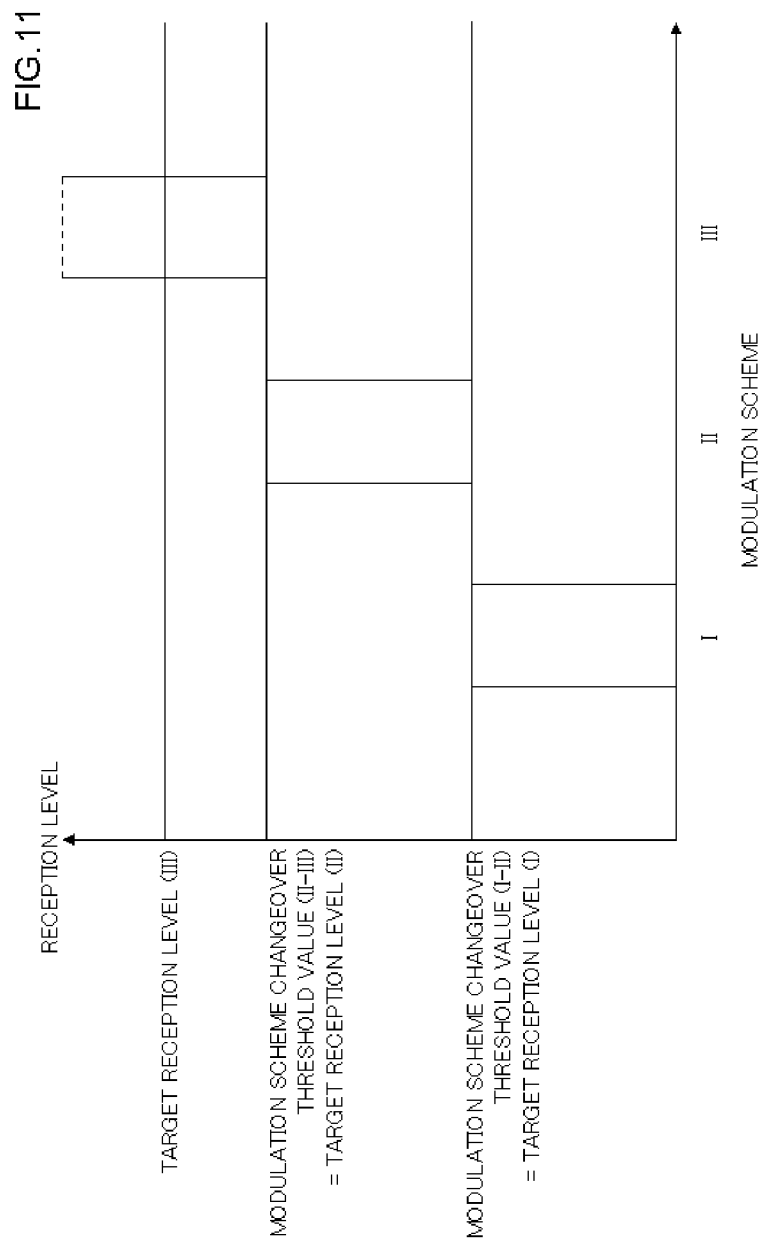

COMMUNICATION DEVICE, COMMUNICATION CONTROL METHOD AND A COMPUTER-READABLE STORAGE MEDIUM

TECHNICAL FIELD

The present invention relates to a communication device, a communication control method and a computer-readable storage medium, and more particularly, to the communication device, the communication control method and the computer-readable storage medium to which an adaptive modulation and a transmission power control are required for an external transmitter.

BACKGROUND ART

A digital microwave communication system has a merit that can be inexpensively constructed in a short period of time compared with a wired line such as an optical fiber. For this reason, the digital microwave communication system is generally employed as a backhaul link in a mobile network in recent years. And it is required for the backhaul link to further increase its capacity due to a development of a mobile broadband communication represented by an LTE (Long Term Evolution) and a mobile WiMAX (Worldwide Interoperability for Microwave Access).

In the digital microwave communication system, a link budget analysis is generally carried out according to a standard that is specified to G.826 or the like standardized by ITU-T (International Telecommunication Union-Telecommunication Standardization Sector). Therefore, in most cases, the digital microwave communication system is operated in a state having a plenty of room for a communication line quality through a year. In recent years, in order to improve more utilization efficiencies and availabilities of the line, an adaptive modulation scheme is coming to be used, which changes over a modulation scheme suitably depending on a state of a transmission path (e.g., patent literature 1 is referred to).

As to the adaptive modulation scheme disclosed in the patent literature 1, an appropriate modulation scheme is selected at a reception side using a reception signal level or error rate information of a demodulated signal, and a selected result is transmitted to an opposite station side. At the opposite station side, a transmission modulation scheme is changed over depending on the selected result. For example, if a transmission path state is favorable, a modulation scheme with a higher transmission rate such as a multi-level modulation scheme is applied. Accordingly, the adaptive modulation scheme makes it possible to increase a communication capacity compared with a system in which a modulation scheme is fixed. On the contrary, if the transmission path state is quite unfavorable, a modulation scheme capable to respond to its environment such as a modulation scheme with a small modulation multi-level number is applied as the adaptive modulation scheme. Therefore, since it is possible to prevent a line disconnection, line operation rate can be increased.

In the radio communication system using the adaptive modulation scheme, it is very important to control a transmission power because an appropriate reception level needs to be kept in different modulation schemes. For example, a transmission power control method in the radio communication system using the adaptive modulation scheme is disclosed in patent literatures 2 and 3.

In the transmission power control method disclosed in the patent literature 2, an amount of the attenuation of the transmission line is obtained from a Carrier to Noise Ratio (hereinafter referred to as "CNR") of a presumed reception signal at a reception side and a transmission power information multiplexed in the reception signal. And the reception side controls the transmission power of the signal transmitted to equipment of an opposite side according to the obtained attenuation so as to satisfy the required CNR in the modulation scheme at that time.

The transmission power control method disclosed in the patent literature 3 determines the modulation scheme and the transmission power of a signal transmitted to equipment on the opposite side based on a difference between a current reception level and a predetermined required reception level.

A method to control the modulation scheme and the transmission power of the reception signal based on the transmission path state is also disclosed in patent literature 4.

There is also an adaptive modulation scheme which controls the modulation scheme and the transmission power at the opposite station (e.g., patent literature 5 is referred to). The adaptive modulation scheme disclosed in the patent literature 5 requires a modification of the modulation scheme and the transmission power for an opposite side equipment based on a difference between the current reception level and a predetermined required reception level.

PATENT LITERATURE

Patent Literature 1: Japanese Patent Application Laid-Open No. Hei10-41876 (pages 4-5, FIG. 1)
Patent Literature 2: Japanese Patent Application Laid-Open No. 2004-72666 (pages 5-6, FIG. 1)
Patent Literature 3: Japanese Patent Application Laid-Open No. 2007-221357 (pages 8-10, FIG. 3)
Patent Literature 4: Japanese Patent Application Laid-Open No. 2005-236709 (pages 4-5, FIG. 1)
Patent Literature 5: International Publication No. WO2007/138796 (pages 9-13, FIGS. 2-4)

SUMMARY OF THE INVENTION

Technical Problem

Each of the above-mentioned related art technologies has some problems. In the adaptive modulation scheme disclosed in the patent literature 1, the transmission power at the opposite station is not controlled. Therefore, there is a problem that the required reception level may not be secured for an applied modulation scheme.

In the transmission power control method disclosed in the patent literature 2, a transmission level of a local station is determined based on the CNR of signal received at the local station (hereinafter referred to as "reception CNR") and a transmission power information received from an opposite station. The opposite station controls the transmission power based on the reception CNR at the opposite station and the received transmission power information. Therefore, the transmission power control method of the patent literature 2 is assumed to be applied to such a system that the amount of attenuation of an uplink and a downlink can be considered equivalent to each other like a TDD (Time Division Duplex) system. This is because, when the attenuation of the signal to the opposite station from the local station is small, even if the attenuation of the signal from the opposite station to the local station is large, the opposite station does not increase the transmission power. Accordingly, when the local station receives the signal from the opposite station, there is a possibility that the reception level required for the modulation scheme applied to the signal may not be secured. As stated above, the transmission power control method of the patent literature 2 has a problem that it cannot be applied to such a system that cannot be assumed that the attenuations of the uplink and the downlink are equivalent, for example, an FDD (Frequency Division Duplex) system or the like.

Even in the transmission power control method disclosed in the patent literature 3, there is also the same problem as the transmission power control method disclosed in the patent literature 2. That is, the transmission power at the local station is controlled based on a measured reception level at the local station, while an opposite station controls its transmission power based on a measured reception level at the opposite station side. Therefore, the transmission power control method of the patent literature 3 has a problem that it cannot be applied to such a system that cannot be assumed that the attenuations of the uplink and the downlink are equivalent.

In the transmission power control method disclosed in the patent literature 4, the local station also controls the modulation scheme and the transmission power at the local station based on the reception signal. However, it is not mentioned about the control at the opposite station. Therefore, although the modulation scheme and the transmission power at the local station are controlled, there are no guarantees by which the modulation scheme of the signal from the opposite station and the transmission power are controlled appropriately. Accordingly, in the transmission power control method of the patent literature 4, when the local station receives a signal from the opposite station, there is a problem for which the required reception level may not be secured for the modulation scheme applied to the signal. Further, in order also to apply the transmission power control method disclosed in the patent literature 4 to the opposite station, as well as in the local station, it must be assumed that the attenuations of the uplink and the downlink are equivalent like the patent literatures 2 and 3.

In the transmission power control method disclosed in the patent literature 5, it controls the transmission power and decides the modulation scheme when the opposite station transmits a signal. Therefore, the above-mentioned problem related to the reception level when the local station receives the signal from the opposite station, is solved. However, in the patent literature 5, when controlling the reception level at each time, there is no description about a relation between a target value of the reception level (hereinafter referred to as "the target reception level") and the modulation scheme which is being applied at that time. The target reception level will be a judgment standard when requiring a change in the transmission power for the opposite station. Therefore, as its reasons are described in the following, the target reception level needs to be set in conjunction with the modulation scheme at that time. However, there is no description about this thing in the patent literature 5 and other patent literatures 1 to 4.

If the target reception level is not set in conjunction with the modulation scheme at that time, a serious problem would occur and its reason will be described. The transmission power control aims at suppressing the transmission power with a minimum necessity. Accordingly, like the patent literatures 2 to 5, when the adaptive modulation and the transmission power control are merely combined, the target reception level is set according to the modulation scheme with the lowest required reception level in order to secure the predetermined performance (hereinafter referred to as "the lowest rank modulation scheme"). When the target reception level is set in this way, it does not change over to any other modulation scheme but to the lowest rank modulation scheme even if the transmission power is lowered to the lowest limit, unless a transmission environment of the radio wave (hereinafter referred to as "radio wave environment") becomes favorable to exceed the target reception level. Because the lowest rank modulation scheme is often a scheme with the lowest communication rate, its communication rate is always kept with a minimum level unless the radio wave environment is extremely favorable.

Even if the reception level target value is set to the modulation scheme other than the lowest rank modulation scheme, because it is more difficult for a change over to a higher rank modulation scheme, a merit of performing the adaptive modulation decreases. "The higher rank modulation scheme" means a modulation scheme requiring a reception level higher than a reception level to which the current modulation scheme can be applied.

Next, a specific example of the adaptive modulation scheme will be indicated, and a reason that the above-mentioned problem occurs is described in detail. FIGS. 25, 26, 27, 28, 29 and 30 indicate the specific example of the adaptive modulation scheme with the transmission power control. In this way, according to the reception level of the signal, a modulation scheme applied in a transmitter which is a signal transmission source (hereinafter referred to as an "opposite station") is controlled adaptively. At the same time, the local station also requires a modification of the transmission power for the opposite station.

FIG. 25, FIG. 27 and FIG. 29 are graphs showing examples of correlation for the reception level, the modulation scheme and the target reception level. A position to which the target reception level is set is different in FIG. 25, FIG. 27 and FIG. 29, respectively. FIG. 26 is a graph showing an example of an operation of the adaptive modulation scheme corresponding to FIG. 25. FIG. 28 is a graph showing an example of an operation of the adaptive modulation scheme corresponding to FIG. 27. FIG. 30 is a graph showing an example of an operation of the adaptive modulation scheme corresponding to FIG. 29.

As shown in FIG. 25, FIG. 27 and FIG. 29, in the adaptive modulation schemes, each applied modulation scheme is specified so as to correspond to the range of the reception level. And even at a time when the same modulation scheme is applied, BER (Bit Error Rate) is different depending on the reception levels. On the contrary, even if it is the same reception level, there is a possibility that lower BER can be secured in other modulation schemes. Taking the above into consideration, it is a basic idea of the adaptive modulation scheme that when the reception level decreases so that the BER turns no smaller than a certain numerical value, even if it is the reception level, it is changed to a modulation scheme for which lower BER can be secured. In the adaptive modulation shown in FIG. 25, FIG. 27 and FIG. 29, when the numerical value of the BER will be no smaller than $10^{-6}$, it is controlled to be changed over to a modulation scheme which is able to respond to the lower reception level.

There are three kinds of modulation schemes, a modulation scheme I, a modulation scheme II, and a modulation scheme III, in the order of low reception levels at a time of being applied.

The target reception level is the reception level at which BER will be $10^{-10}$. Accordingly, when BER is higher than $10^{-10}$, the local station requires increase of the transmission power for the opposite station. When BER is lower than $10^{-10}$, the local station requires decrease of the transmission power for the opposite station. However, when the transmission power of the opposite station reaches a maximum value or a minimum value, transmission power is not increased or not decreased, respectively, any more.

In such case, the reception level cannot be made identical with the target reception level.

Henceforth, the reception level that becomes a boundary for changing over the modulation schemes is called a "modulation scheme changeover threshold value". And the modulation scheme changeover threshold value when changing over the modulation scheme I and the modulation scheme II, is designated as a "modulation scheme changeover threshold value (I-II)". Similarly, the modulation scheme changeover threshold value when changing over modulation scheme II and the modulation scheme III, is designated as a "modulation scheme changeover threshold value (II-III)".

In the adaptive modulation scheme of FIG. 25, the target reception level is set to be smaller than the numerical value of the modulation scheme changeover threshold value (I-II). In the adaptive modulation scheme of FIG. 27, the target reception level is set to be in a middle of the modulation scheme changeover threshold value (I-II) and the modulation scheme changeover threshold value (II-III). In the adaptive modulation scheme of FIG. 29, the target reception level is set to be larger than the numerical value of the modulation scheme changeover threshold value (II-III).

First, an example of an operation when performing the adaptive modulation shown in FIG. 25 will be described specifically by referring to FIG. 26.

In an initial state, because the transmission power is controlled by the predetermined value, the reception level is being fixed with the target reception level. At that time, because the reception level is lower than the modulation scheme changeover threshold value (I-II), the modulation scheme I is applied to the modulation scheme of the opposite station.

At that time, when the reception level decreases due to deterioration of the radio wave environment or the like, and the target reception level is decreased below (time t001), the local station requires the increase of the transmission power for the opposite station. Henceforth, while the reception level is lower than the target reception level, the local station continues requiring the increase of the transmission power for the opposite station.

When the requirement for the increase of the transmission power is continued, the transmission power of the opposite station eventually reaches a maximum value (t002). When the radio wave environment is deteriorated after that, the reception level is further decreased.

Here, when the reception level increases and reaches the target reception level (t003) due to an improvement of the radio wave environment or the like, the local station requires the decrease of the transmission power for the opposite station. Henceforth, while the reception level exceeds the target reception level, the local station continues requiring a decrease of the transmission power for the opposite station.

When the reception level continues to increase (t004), after the transmission power of the opposite station reaches a minimum value, the reception level exceeds the modulation scheme changeover threshold value (I-II) (t005). At that time, the local station requests the opposite station to change its modulation scheme to the modulation scheme II. When the reception level increases after that and exceeds the modulation scheme changeover threshold value (II-III) (t006), the local station requests the opposite station to change its modulation scheme to the modulation scheme III.

As described above, in the adaptive modulation scheme of FIG. 25, there is no possibility to apply the modulation scheme II and the modulation scheme III other than the radio wave environment is so favorable that the reception level still exceeds the target reception level even if the transmission power of the opposite station reaches the minimum transmission power. In other words, a possibility of applying the modulation scheme II and the modulation scheme III are extremely low.

Next, an example of an operation when performing the adaptive modulation shown in FIG. 27 will be described specifically by referring to FIG. 28.

In the initial state, because the transmission power is controlled with the predetermined value, the reception level is fixed with the target reception level. At that time, because the reception level is larger than the modulation scheme changeover threshold value (I-II) and smaller than the modulation scheme changeover threshold value (II-III), the modulation scheme II is applied to the modulation scheme of the opposite station.

When the reception level decreases in this state, its operation is basically the same as the adaptive modulation scheme shown in FIG. 26. That is, when the reception level decreases below the target reception level (time t011), the local station requests the increase of the transmission power for the opposite station. Henceforth, while the reception level is lower than the target reception level, the local station continues to require the increase of the transmission power for the opposite station.

When the local station continues to require the increase of the transmission power for the opposite station, the transmission power of the opposite station eventually reaches a maximum value (t012). When the radio wave environment is deteriorated after that, the reception level is further decreased.

And when the reception level decreases to the extent (t013) below the modulation scheme changeover threshold value (I-II), the local station requests the opposite station to change its modulation scheme to the modulation scheme I.

When the reception level increases to exceed the modulation scheme changeover threshold value (I-II) (t014), the local station requests the opposite station to change its modulation scheme to the modulation scheme II.

When the reception level is further increased and reaches the target reception level (t015), the local station requires more decrease of the transmission power for the opposite station. Henceforth, while the reception level exceeds the target reception level, the local station continues to require the decrease of the transmission power for the opposite station.

When the increase of the reception level continues after the transmission power of the opposite station reaches the minimum value, the reception level exceeds the target reception level (t016), and before long, it reaches the modulation scheme changeover threshold value (II-III) (t017). At that time, the local station requests the opposite station to change its modulation scheme to the modulation scheme III.

As stated above, in the adaptive modulation scheme of FIG. 27, only when the radio wave environment is so favorable that the reception level still exceeds the target reception level even if the transmission power of the opposite station reaches the smallest transmission power, the modulation scheme III may be applied. In other words, a possibility that the modulation scheme III is applied is extremely low. In this way, in view of an aspect that there is a possibility of being unable to apply a modulation scheme which is assumed to be applied when the reception level is high, the adaptive modulation scheme of FIG. 27 has the same problem as the adaptive modulation scheme of FIG. 25.

It may be considered that the target reception level is set to a higher numerical value. In the following, an example of an operation when performing the adaptive modulation shown in FIG. 29 will be described specifically by referring to FIG. 30.

In an initial state, because the transmission power is controlled to the predetermined value, the reception level is fixed with the target reception level. At that time, because the reception level is higher than the modulation scheme changeover threshold value (II-III), the modulation scheme III is applied to the modulation scheme of the opposite station.

When the reception level decreases in this state, its operation is basically the same as the adaptive modulation schemes shown in FIG. 26 and FIG. 28. That is, when the reception level decreases below the target reception level (time t021), the local station requires the increase of the transmission power for the opposite station. Henceforth, while the reception level is lower than the target reception level, the local station continues to require the increase of the transmission power for the opposite station.

When a requirement for the increase of the transmission power is continued, the transmission power of the opposite station eventually reaches a maximum value (t022). When the radio wave environment is deteriorated after that, the reception level is further decreased, and the reception level decreases below the modulation scheme changeover threshold value (II-III) at last (t023). At that time, the local station requests the opposite station to change its modulation scheme to the modulation scheme II. When the reception level decreases further to the extent below the modulation scheme changeover threshold value (I-II) (t024), the local station requests the opposite station to change its modulation scheme to the modulation scheme I.

When the reception level is increased to exceed the modulation scheme changeover threshold value (I-II) (t025), the local station requests the opposite station to change its modulation scheme to the modulation scheme II. When the reception level is further increased to exceed the modulation scheme changeover threshold value (II-III) (t026), the local station requests the opposite station to change its modulation scheme to the modulation scheme III.

When the increase of the reception level continues and reaches the target reception level (t027), the local station requires the decrease of the transmission power for the opposite station. Henceforth, while the reception level exceeds the target reception level, the local station continues to require the decrease of the transmission power for the opposite station. When the increase of the reception level continues (t028), after the transmission power of the opposite station reaches the minimum transmission power, the reception level exceeds the target reception level.

As described above, in the adaptive modulation of FIG. 30, it can be changed over to the modulation scheme of the higher rank. However, even when the modulation scheme I or II is applied, there occurs a problem such that a control is always performed so as to promote the transmission power to the level that can be also applied to the modulation scheme III.

Fundamental cause of generating two kinds of the above-mentioned problems, i.e., problems of a possibility that the modulation scheme of the higher rank is not applied and the transmission power control to the extent of a surplus level, is that the target reception level, i.e., the power level threshold value for the transmission power control is fixed to a certain level in spite of the applied modulation schemes.

However, there is no description about the target reception level in the patent literatures 1 to 4. In the patent literature 5, although there is a description about the target reception level, there is no descriptions and suggestions about a necessity and a meaning of setting the target reception level in connection with the modulation scheme.

Object of the Invention

The present invention is performed in view of the above-mentioned technical problems, and its object is to provide the communication device, a communication control method and a computer-readable storage medium which is capable of applying the transmission power and the modulation scheme adaptable for the environment installed with the communication device to a signal transmission source.

Solution To Problem

A communication device of the present invention includes: a reception means for receiving a signal treated with a setting of a modulation scheme based on a modulation scheme designation information and a controlling of a transmission power based on the transmission power designation information by an external transmitter, demodulating the received signal based on a modulation scheme control information, and outputting a received data; a reception level measurement means for measuring a signal level of the signal and outputting the reception level; a designation information output means for outputting the transmission power designation information correlated to the modulation scheme designation information and the modulation scheme based on the reception level; and a transmission means for transmitting the modulation scheme designation information and the transmission power designation information to the transmitter.

A communication control method of the present invention includes: receiving a signal treated with a setting of a modulation scheme based on a modulation scheme designation information and a controlling of a transmission power based on the transmission power designation information by an external transmitter, demodulating the received signal based on a modulation scheme control information, and outputting a received data; measuring a signal level of the signal and outputting the reception level; outputting the modulation scheme control information based on the received data; outputting the modulation scheme designation information based on the reception level; outputting the transmission power designation information correlated to the modulation scheme based on the reception level; and transmitting the modulation scheme designation information and the transmission power designation information to the transmitter.

Further, a communication control method of the present invention includes: based on an obtained reception level as a result of measuring a signal level of a signal treated with a setting of a modulation scheme based on a modulation scheme designation information and a controlling of a transmission power based on the transmission power designation information by an external transmitter, outputting at least one of the modulation scheme control information transmitted to the transmitter and the transmission power designation information correlated to the modulation scheme.

A computer-readable storage medium of the present invention enables a computer equipped in a communication device to function as the following means including: means for outputting a received data by receiving a signal treated with a setting of a modulation scheme based on a modulation scheme designation information and control of a transmission power based on the transmission power designation information by an external transmitter and demodulating the received signal based on a modulation scheme control information;

means for measuring a signal level of the signal and outputting the reception level; means for outputting the modulation scheme control information based on the received data; means for outputting the modulation scheme designation information based on the reception level; means for outputting the transmission power designation information correlated to the modulation scheme based on the reception level; and means for transmitting the modulation scheme designation information and the transmission power designation information to the transmitter.

Or, a computer-readable storage medium of the present invention enables a computer equipped in a communication device to function as the following means including: means for outputting, based on an obtained reception level as a result of measuring a signal level of a signal treated with a setting of a modulation scheme based on a modulation scheme designation information and a controlling of a transmission power based on the transmission power designation information by an external transmitter, at least one of the modulation scheme control information transmitted to the transmitter and the transmission power designation information correlated to said modulation scheme.

Advantageous Effects of Invention

The communication device, the communication control method and the computer-readable storage medium according to the present invention, each designates a modulation scheme based on the reception level for a signal transmission source, and moreover, applies the transmission power in response to the designated modulation scheme. Accordingly, it has an advantage that the transmission power and the modulation scheme adaptable for the environment installed with the communication device can be applied to the signal transmission source.

BRIEF DESCRIPTION OF DRAWINGS

FIG. 2: A table showing a corresponding relation of the reception level, the modulation scheme and the target reception level in the adaptive modulation scheme of the first exemplary embodiment of the present invention.

FIG. 3: A graph showing a corresponding relation of the reception level and the target reception level in the adaptive modulation scheme of the first exemplary embodiment of the present invention.

FIG. 4: A graph showing an operation of the adaptive modulation scheme of the first exemplary embodiment of the present invention.

FIG. 5: A block diagram showing a structure of a modification of the communication device of the first exemplary embodiment of the present invention.

FIG. 6: A graph showing a corresponding relation of the reception level and the target reception level in the adaptive modulation scheme of a second exemplary embodiment of the present invention.

FIG. 7: A graph showing an operation of the adaptive modulation scheme of the second exemplary embodiment of the present invention.

FIG. 8: A table showing a corresponding relation of the reception level, the modulation scheme and the target reception level in the adaptive modulation scheme of a third exemplary embodiment of the present invention.

FIG. 9: A graph showing a corresponding relation of the reception level and the target reception level in the adaptive modulation scheme of the third exemplary embodiment of the present invention.

FIG. 10: A graph showing an operation of the adaptive modulation scheme of the third exemplary embodiment of the present invention.

FIG. 11: A graph showing a corresponding relation of the reception level and the target reception level in the adaptive modulation scheme of a fourth exemplary embodiment of the present invention.

DESCRIPTION OF EMBODIMENTS

Exemplary Embodiment 1

Figure 1:
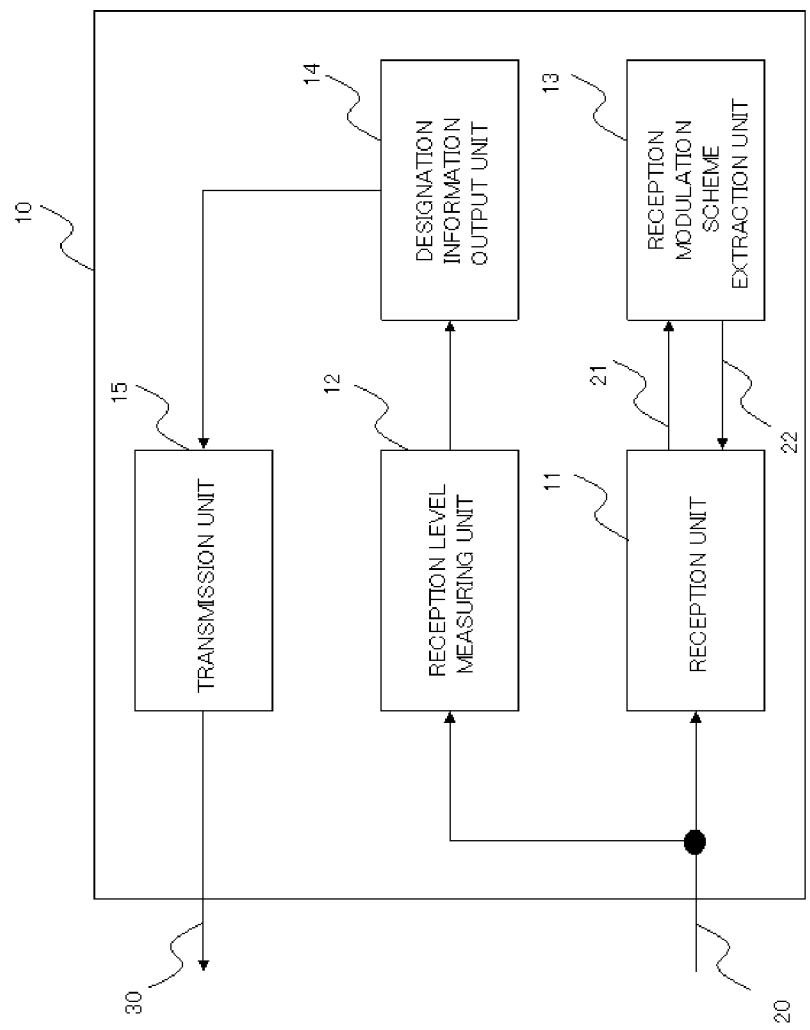
FIG. 1: A block diagram showing a structure of the communication device of a first exemplary embodiment of the present invention.

A detailed explanation of embodiments of the present invention will be described by referring to drawings in the following. FIG. 1 is a block diagram showing a structure of the communication device of the first exemplary embodiment for carrying out the present invention. FIG. 2 is a table showing a corresponding relation of the reception level, the modulation scheme and the target reception level in the adaptive modulation scheme of the first exemplary embodiment of the present invention. FIG. 3 is a graph showing a corresponding relation of the reception level and the target reception level in an adaptive modulation control of the first exemplary embodiment. FIG. 4 is a graph showing a time shift of the reception level and a variation in a transmission power of the transmitter and an applied modulation scheme when performing the adaptive modulation control in the first exemplary embodiment.

Referring to FIG. 1, the configuration of the communication device of the first exemplary embodiment will be described. The communication device 10 of the first exemplary embodiment includes a reception unit 11, a reception level measuring unit 12, a reception modulation scheme extraction unit 13, a designation information output unit 14 and a transmission unit 15.

The reception unit 11 receives a signal 20, and demodulates the received signal 20 and then outputs a received data 21. The signal 20 is a signal transmitted by an external transmitter (not shown). The signal 20 is a transmitted signal after receiving a predetermined control based on a modulation scheme designation information and transmission power designation information to be described later. That is, the signal 20 is a signal which is modulated by the modulation scheme being set based on the modulation scheme designation information and which is transmitted by the transmission power being set based on the transmission power designation information.

The reception level measuring unit 12 measures a signal level of the signal 20. The signal level is a numerical value which indicates signal strength such as amplitude and an electric power of the received signal 20. The reception level can be measured by using various methods. As for the measurement method of the reception level, because it is not an essential part of the present invention, the detailed description of it will be omitted.

The reception modulation scheme extraction unit 13 extracts modulation scheme control information 22 which indicates a modulation scheme applied to the signal 20 based on the modulation scheme control information included within the received data 21 transmitted from the transmitter. The modulation scheme extracted at that time is the modulation scheme which is to be applied to the signal 20. The modulation scheme which is applied to the signal 20 which is being received at present is judged based on a modulation scheme control information 22 which is included in the signal 20 received one step before. In other words, the transmitter transmits the modulation scheme which is applied to the signal 20 to be transmitted next as the modulation scheme control information 22 so as to be included within the signal 20 which is being transmitted. In this manner, the signal 20 is a series of signal with a limited length called a frame or a packet or the like. Accordingly, when the signal 20 is transmitted a plurality of times, a plurality of transmitted signals 20 can be distinguished. The modulation scheme at initial state prior to receiving the signal 20 should be fixed to a predetermined method in advance.

The designation information output part 14 outputs the modulation scheme designation information and the transmission power designation information based on the reception level measured by the reception level measuring unit 12. The modulation scheme designation information is information which designates the modulation scheme to be applied when the transmitter transmits the signal 20. The transmission power designation information is an information used for determine the transmission power to be applied when the transmitter transmits the signal 20. For example, the transmission power designation information is a numerical value or the like which directly designates a requirement of an increase or a decrease of the transmission power, an increase or a decrease value of the transmission power, or the transmission power.

The designation information output unit 14 may be divided into two blocks such that one block outputs the modulation scheme designation information and the other block outputs the transmission power designation information and thereby independently processing for generating the designation information. Or, the whole function of the designation information output part 14 may be taken in the transmission unit 15 which will be mentioned later.

The amounts of information of the transmission power designation information, e.g., the number of bits, are different depending on the contents of the information. In the above-mentioned example, when the transmission power designation information is the information which indicates the requirement of the increase or the decrease of the transmission power is the least one as the amount of the information, and it is possible to express it by 1 bit.

The transmission unit 15 transmits the modulation scheme designation information and the transmission power designation information to the transmitter.

Next, an operation of the communication device of the first exemplary embodiment will be described by referring to drawings. As shown in FIG. 2 and FIG. 3, in the present embodiment, the target reception level is set so as to correlate to the modulation scheme. Accordingly, hereinafter, the target reception level in the modulation scheme I is designated as a "target reception level (I)", the target reception level in the modulation scheme II is designated as a "target reception level (II)", and the target reception level in the modulation scheme III is designated as a "target reception level (III)". In the corresponding table of FIG. 2, a "modulation scheme changeover threshold value" is just abbreviated as a "changeover threshold value".

As shown in FIG. 2 and FIG. 3, the modulation schemes are specified for each range of the reception levels. Specifically, when the reception level is lower than the modulation scheme changeover threshold value (I-II), it requires applying the modulation scheme I to the transmitter. The target reception level (I) at that time is larger than the modulation scheme changeover threshold value (I-II). When the reception level is no smaller than the modulation scheme changeover threshold value (I-II) but lower than a modulation scheme changeover threshold value (II-III), it requires applying the modulation scheme II to the transmitter. The target reception level (II) at that time is larger than the modulation scheme changeover threshold value (II-III). And when the reception level is no smaller than the modulation scheme changeover threshold value (II-III), it requires applying the modulation scheme III to the transmitter. The target reception level (III) at that time is larger than the modulation scheme changeover threshold value (II-III) and the target reception level (II). However, the target reception level III should be larger than the modulation scheme changeover threshold value (I-II), and does not need to be larger than the target reception level II necessarily.

When the communication device requires that a certain modulation scheme is applied to the transmitter, it is performed by transmitting the above-mentioned modulation scheme designation information to the transmitter.

First, an operation of the communication device of the first exemplary embodiment will be described by referring to drawings. The target reception level changes depending on the modulation scheme applied at that time. In the following, an example of the operation will be described specifically by referring to FIG. 4.

In the initial state, the modulation scheme III which is the modulation scheme of the highest rank is applied to the modulation scheme of the transmitter. Because the transmission power is controlled by the predetermined value, the reception level is fixed to the target reception level (III).

At that time, when the reception level is decreased to the extent below the target reception level (time t11) owing to deterioration of the radio wave environment or the like, the communication device 10 requires the increase of the transmission power for the transmitter. Henceforth, while the reception level is lower than the target reception level, the communication device 10 continues to require the increase of the transmission power for the transmitter.

When the communication device requires the increase and the decrease of the transmission power for the transmitter, it is performed by transmitting the above-mentioned transmission power designation information to the transmitter.

When continuing the requirement for the increase of the transmission power, the transmission power of the transmitter eventually reaches a maximum value (t12). When the radio wave environment is deteriorated after that, the reception level is continued to decrease and the reception level reaches below the modulation scheme changeover threshold value (II-III) at last (t13). At that time, the communication device 10 requests the transmitter to change its modulation scheme to the modulation scheme II. Furthermore, the communication device 10 changes its target reception level to the target reception level (II). At that time, although the reception level is lower than the target reception level (II), because the transmission power of the transmitter already reaches the maximum value, and the transmission power cannot be increased, the reception level is further decreased.

And when the reception level reaches the modulation scheme changeover threshold value (I-II) (t14), the communication device 10 requests the transmitter to change its modulation scheme to the modulation scheme I.

Furthermore, the communication device 10 changes its target reception level to the target reception level (I). At that time, although the reception level is lower than the target reception level (I), because the transmission power of the transmitter already reaches the maximum value, and the transmission power cannot be increased, the reception level is further decreased.

Here, when the reception level increases owing to a recovery or the like of the radio wave environment, and the reception level reaches the modulation scheme changeover threshold value (I-II) (t15), the communication device requests the transmitter to change its modulation scheme to the modulation scheme II. Furthermore, the communication device 10 changes its target reception level to the target reception level (II).

When the reception level still increases and the reception level reaches the modulation scheme changeover threshold value (II-III) (t16), the communication device requests the transmitter to change its modulation scheme to the modulation scheme III. Further, the communication device 10 changes its target reception level to the target reception level (III).

When the increase of the reception level continues and reaches the target reception level (III) (t17), the transmission power control is carried out. That is, the communication device 10 requires the decrease of the transmission power for the transmitter. Even if the transmission power of the transmitter will be the minimum value, when the reception level still increases, the reception level exceeds the target reception level (III) (t18).

In this manner, according to this exemplary embodiment, the target reception level is set to be higher than the modulation scheme changeover threshold value for changing over to the modulation scheme of a higher rank. Therefore, the increase of the transmission power is required for the transmitter in order always to change over to the modulation scheme of the higher rank further. "The modulation scheme of the higher rank" in here indicates the modulation scheme II as to the modulation scheme I, and the modulation scheme III as to the modulation scheme II, respectively. In a description of the exemplary embodiment hereinafter, "the modulation scheme of the higher rank" is used with the above-mentioned meaning.

The designation information output part 14 may be provided with a target reception level setting section 16 to which the target reception level is set so as to be corresponded with the modulation scheme and the transmission power. A block part that indicates a structure of the communication device 10 equipped with the target reception level setting section is shown in FIG. 5. For example, the target reception level setting section 16 should hold a table as shown in FIG. 2 which designates the range of the reception level, the modulation scheme corresponding to that and the target reception level. In this case, the designation information output part 14 should designate the modulation scheme based on the reception level at that time and generate the transmission power designation information obtained from an excess and deficiency of the reception level as to the target reception level.

In the above-mentioned description, irrespective of the size of the transmission power of the transmitter, the communication device 10 is designed to require the increase and decrease of the transmission power by transmitting the transmission power designation information. For this reason, when the transmission power of the transmitter reaches the maximum value, further increase of the transmission power may be required, and when it reaches the minimum value, further decrease may be required. Accordingly, only in the case that the increase or the decrease of the transmission power is possible, the information about the size of the transmission power of the transmitter may be required by obtaining it from the transmitter, or managing it within the communication device 10.

By the way, the radio wave environment is generally unstable because it undergoes an influence of various kinds of environment such as natural condition. Therefore, even if the transmission power of the transmitter is constant, the reception level fluctuates in terms of time. In an ideal environment, as stated above, it is preferable to change over one of two schemes, when the target reception level is regarded as a threshold value, such that a scheme A is selected when the reception level is no smaller than the threshold value while a scheme B is selected when the reception level is smaller than the threshold value. However, when the reception level fluctuates irregularly around the threshold value, the modulation schemes may be frequently changed for a short period.

Accordingly, considering a practical aspect, a hysteresis control may be introduced into the controlling of the modulation scheme and the transmission power. Specifically, the modulation scheme changeover threshold value (I-II) of changing from the modulation scheme I to the modulation scheme II is made larger than the modulation scheme changeover threshold value (I-II) of changing from the modulation scheme II to the modulation scheme I. Similarly, the modulation scheme changeover threshold value (II-III) of changing from the modulation scheme II to the modulation scheme III is made larger than the modulation scheme changeover threshold value (II-III) of changing from the modulation scheme III to the modulation scheme II. By setting the modulation scheme changeover threshold value in this manner, because there are no cases that the modulation scheme returns to an original scheme temporarily when the reception level fluctuates temporarily just after the changeover in the modulation scheme, an operation can be made stable. Because it is a well-known technology for a person skilled in the art about the hysteresis control, additional detailed description will be omitted.

In the above-mentioned description, it was supposed that the modulation scheme is selected from three kinds of the modulation schemes I, II and III. The number of choices of the modulation schemes should be a plural, but the number is not limited in particular.

The specific modulation scheme of the modulation schemes I, II and III are not limited in particular. However, it is desirable to determine an order of the modulation schemes I, II and III by considering that the modulation schemes I, II and III are selected in a low order of the reception levels in that case. For example, there is a method to decide the modulation schemes I, II and III in a low order of the reception level and a carrier-to-noise ratio or the like which are needed to satisfy a communication speed, a throughput and a communication performance such as the BER which are required as the communication device. Specifically, the modulation schemes I, II and III may be set based on the required reception level for respectively securing the predetermined communication performance. The modulation schemes I, II and III may be set based on the carrier-to-noise ratio for respectively securing the predetermined communication performance. The modulation schemes I, II and III may be set in a low order of respective transmission rates. Or, the modulation schemes I, II and III may be set in a small order of a modulation multi-level number (such as 4, 8 and 16 levels, for example) in the same scheme (for example, orthogonal amplitude modulation, etc).

The signal 20 may be a signal with the controllable modulation scheme and transmission power. Accordingly, a medium for transmitting the signal 20 may be a wireless or a wire.

Advantage of the Exemplary Embodiment 1

As described above, in the communication device of the first exemplary embodiment, the target reception level is correlated to the modulation scheme applied at that time. In the communication device of the first exemplary embodiment, moreover, the target reception level is set to be higher than the modulation scheme changeover threshold value when changing the modulation scheme to the modulation scheme of the higher rank. Therefore, when the modulation scheme changes over to the modulation scheme of the higher rank, the target reception level is further pulled up to the level that should be changed to the modulation scheme of the higher rank. In other words, there are no cases that the reception level at that time reaches the target reception level. Accordingly, when the reception level is increasing, it is always controlled so as to be pulled up to the modulation scheme of the higher rank, and thereby providing such advantage that it is returned to the modulation scheme of the higher rank early. For example, when the modulation scheme of the higher rank has a transmission rate higher than the modulation scheme of the lower rank, the modulation scheme is controlled so that it may return to a higher-speed modulation scheme early.

In this manner, in the adaptive modulation scheme of this exemplary embodiment, because the target reception level is set to the level in which the modulation scheme of the higher rank is applicable, it is always controlled so that the modulation scheme with the highest communication rate may be selected. To this end, the adaptive modulation scheme of this exemplary embodiment can be called a "highest rank modulation scheme selection method".

Exemplary Embodiment 2

According to the first exemplary embodiment, the target reception level corresponding to a certain modulation scheme was set more highly than the modulation scheme changeover threshold value when changing over to the modulation scheme of the higher rank of its modulation scheme. Contrary to this, the target reception level corresponding to the certain modulation scheme may be set lower than the modulation scheme changeover threshold value when changing over to the modulation scheme of the higher rank of its modulation scheme. In the communication device of the second exemplary embodiment, the target reception level is set to be lower than the modulation scheme changeover threshold value, and thereby judging the necessity of the requirement of the change in either one or both of the modulation scheme and the transmission power.

FIG. 6 is a graph showing a corresponding relation of the reception level and the target reception level in the adaptive modulation control of the second exemplary embodiment. FIG. 7 is a graph showing a time shift of the reception level and a variation in a transmission power of the transmitter and an applied modulation scheme when carrying out the adaptive modulation control in the second exemplary embodiment.

Because the structure of the communication device of the second exemplary embodiment is the same as the communication device 10 of the first exemplary embodiment shown in FIG. 1, the description about the structure will be omitted. However, an operation in the designation information output unit is different from that of the communication device 10 of the first exemplary embodiment. The operation of the communication device of the second exemplary embodiment controlled by the designation information output unit of the communication device of the second exemplary embodiment will be described in detail in the following.

As shown in FIG. 6, according to the second exemplary embodiment, the target reception level (I) is set to be lower than the modulation scheme changeover threshold value (I-II), and the low target reception level (II) is set to be lower than the modulation scheme changeover threshold value (II-III).

First, an operation of the communication device of the second exemplary embodiment will be described by referring to drawings. An example of the operation will be described specifically by referring to FIG. 7 in the following.

In the initial state, the modulation scheme III is applied to the modulation scheme of an external transmitter. Because the transmission power is controlled to the predetermined value, the reception level is constant with the target reception level (III).

At that time, when the reception level declines to the extent below the target reception level (III) (time t21) owing to an deterioration of the radio wave environment or the like, the communication device 10 requires the increase of the transmission power for the transmitter. Henceforth, while the reception level is lower than the target reception level (III), the communication device 10 continues to require the increase of the transmission power for the transmitter.

When the communication device 10 continues requiring the increase of the transmission power, the transmission power of the transmitter eventually reaches the maximum value (t22). When the radio wave environment is deteriorated after that, the reception level is going to decrease and the reception level falls below the modulation scheme changeover threshold value (II-III) at last (t23). At that time, the communication device 10 requests the transmitter to change its modulation scheme to the modulation scheme II. Further, the communication device 10 changes the target reception level to the target reception level (II). At that time, because the reception level exceeds the target reception level (II), the communication device 10 requires the decrease of the transmission power for the transmitter.

And when the reception level decreases to the target reception level (II) (t24), the transmission power control is performed to the target reception level target (II). Therefore, the communication device 10 requires the increase of the transmission power for the transmitter. Even after the transmission power of the transmitter reaches its maximum value, when the reception level decreases to the extent below the target reception level (II) (t25) and reaches the modulation scheme changeover threshold value (I-II) (t26), the communication device 10 requests the transmitter to change its modulation scheme to the modulation scheme I. Furthermore, the communication device 10 changes the target reception level to the target reception level (I). At that time, because the reception level exceeds the target reception level (I), the communication device 10 requires the decrease of the transmission power for the transmitter.

And when the reception level decreases to the target reception level (I) (t27), the transmission power control to the target reception level (I) is carried out. To do this, the communication device 10 requires the increase of the transmission power for the transmitter. When the radio wave environment or the like is deteriorated after the transmission power of the transmitter reaches its maximum value, the reception level falls below the target reception level (I) (t28).

Here, when the reception level increases due to a recovery of the radio wave environment or the like, and the reception level reaches the target reception level (I) (t29), the transmission power control as to the target reception level (I) is carried out. That is, the communication device 10 controls the reception level to the target reception level (I) by requiring the decrease of the transmission power for the transmitter. And after the transmission power reaches its minimum value, when the reception level increases and exceeding the target reception level (I) (t30) to reach the modulation scheme changeover threshold value (I-II) (t31), the communication device requests the transmitter to change its modulation scheme to the modulation scheme II. Furthermore, the communication device 10 changes the target reception level to the target reception level (II).

Even when the reception level still increases to exceed the target reception level (II) (t32), because the transmission power already reaches its minimum value, the transmission power control is not performed. Therefore, the reception level keeps rising and reaches (t33) the modulation scheme changeover threshold value (II-III). At that time, the communication device requests the transmitter to change its modulation scheme to the modulation scheme III. Furthermore, the communication device 10 changes the target reception level to the target reception level (III).

Because the transmission power has already been lowered to the minimum value, the reception level exceeds the target reception level (III) after the increase of the reception level continues to reach the target reception level (III) (t34).

Advantage of the Exemplary Embodiment 2

As described above, in the communication device of the second exemplary embodiment, the target reception level is correlated to the modulation scheme applied at that time, and moreover, the modulation scheme changeover threshold value when changing the modulation scheme to the modulation scheme of the lower rank, is set to be higher than the target reception level in the modulation scheme of the lower rank. Therefore, when the modulation scheme is changed over to the modulation scheme of the lower rank, the transmission power of the transmitter can be decreased so that the reception level will not be equal to or beyond the target reception level in the modulation scheme of the lower rank. Accordingly, it has an advantage that an electrical power-saving for the transmission power of the transmitter is possible.

In this manner, in the adaptive modulation scheme of the second exemplary embodiment, because the target reception level is set to the level in which the current modulation scheme is applicable, it is always controlled so that the transmission power will be an appropriate level. To this end, the adaptive modulation scheme of this exemplary embodiment can be called a "power-saving method".

Exemplary Embodiment 3

The first exemplary embodiment has a feature at the time of the increase of the reception level while the second exemplary embodiment has a feature at the time of decrease of the reception level. Therefore, by combining the first exemplary embodiment and the second exemplary embodiment, more advanced advantage can be obtained. As to the third exemplary embodiment, an exemplary embodiment which combined the first exemplary embodiment and the second exemplary embodiment is indicated below.

FIG. 8 is a table showing a corresponding relation of the reception level, the modulation scheme and the target reception level in the adaptive modulation scheme of a third exemplary embodiment of the present invention. FIG. 9 is a graph showing a corresponding relation of the reception level and the target reception level in the adaptive modulation scheme of the third exemplary embodiment of the present invention. FIG. 10 is a graph showing a time shift of the reception level and a variation in a transmission power of the transmitter and an applied modulation scheme when performing the adaptive modulation control in the third exemplary embodiment.

Because the structure of the communication device of the third exemplary embodiment is also the same as the communication device 10 of the first exemplary embodiment shown in FIG. 1, the description about its structure will be omitted. However, an operation in the designation information output unit is different from that of the communication device 10 of the first exemplary embodiment. The operation of the communication device of the third exemplary embodiment controlled by the designation information output unit of the communication device of the third exemplary embodiment will be described in detail in the following.

Even in the third exemplary embodiment, as shown in FIGS. 8 and 9, the target reception level is set so as to be correlated to the modulation scheme. Furthermore, in the third exemplary embodiment, the target reception levels are set to be different for a decreasing period and an increasing period of the reception level, respectively.

That is, in the modulation scheme I, the target reception levels in decreasing time and increasing time of the reception level are set to be a target reception level (I−) and a target reception level (I+), respectively. In the modulation scheme II, the target reception levels in the decreasing time and the increasing time of the reception level are set to be a target reception level (II−), respectively. And the magnitude correlations among these numerical values are as follows:

The target reception level (I−)<the modulation scheme changeover threshold value (I-II)<the target reception level (I+)

The target reception level (II−)<the modulation scheme changeover threshold value (II-III)<the target reception level (II+)

The target reception levels (III) are the same for the falling time and the rising time of the reception level.

Next, an operation of the communication device of the third exemplary embodiment will be described by referring to drawings. The target reception level changes according to the increase and the decrease of the reception level and the applied modulation scheme at that time. As it will be understood easily from FIG. 10, the communication device of the third exemplary embodiment indicates a totally same behavior as the second exemplary embodiment shown in FIG. 7 when the reception level falls. And when the reception level rises, it indicates exactly the same behavior as the first exemplary embodiment shown in FIG. 4. That is, the adaptive modulation control using power-saving method is performed when the reception level is falling, and the adaptive modulation control using the highest rank modulation scheme selection method is carried out when the reception level is rising. Because the adaptive modulation controls by the respective methods have been described in the second exemplary embodiment and the first exemplary embodiment, respectively, its description will be omitted here.

Advantage of the Exemplary Embodiment 3

As described above, the communication device of the third exemplary embodiment also decrease the target reception level when the reception level falls and when the modulation scheme is changed to the modulation scheme of the lower rank. Therefore, when the modulation scheme is changed over to the modulation scheme of the lower rank, the communication device of the third exemplary embodiment decreases the transmission power of the transmitter so that the reception level will not be equal to or beyond the target reception level in the modulation scheme of the lower rank. Therefore, it has an advantage that an electrical power-saving for the transmission power of the transmitter is possible.

And in the communication device of the third exemplary embodiment, when the modulation scheme is changed to the modulation scheme of the higher rank during the reception level is rising, the target reception level is also increased. Therefore, the reception level at that time never reaches the target reception level. Accordingly, it is always controlled so as to be pulled up to the modulation scheme of the higher rank, and thereby providing such advantage that it is returned to the modulation scheme of the higher rank early.

In this manner, in the communication device of the third exemplary embodiment, the advantage can be obtained in either falling or rising of the reception level.

When the adaptive modulation control during the reception level is falling is not limited to power-saving method, but other method in which the target reception level is maintained when predetermined condition is satisfied, may be adopted. For example, when the changeover to the modulation scheme of the lower rank can be prevented by increasing the transmission power, the target reception level may be maintained. In this case, when the decrease of the reception level can not be avoided, it is changed over to the modulation scheme of the lower rank, and the power-saving can be achieved by decreasing the target reception level. And when the decrease of the reception level can be prevented, it is possible to either avoid the changeover to the modulation scheme of the lower rank or promote the return to a current modulation scheme after the changeover to the modulation scheme of the low rank.

In this manner, by setting the target reception level to various positions under the condition which is set according to the purpose, various controls can be performed.

Exemplary Embodiment 4

In the communication device of the first exemplary embodiment, the target reception level was set to be higher than the modulation scheme changeover threshold value. In the communication device of the second exemplary embodiment, the target reception level was set to be lower than the modulation scheme changeover threshold value. In the communication device of the fourth exemplary embodiment, the target reception level is set to the same as the modulation scheme changeover threshold value.

Figure 12:
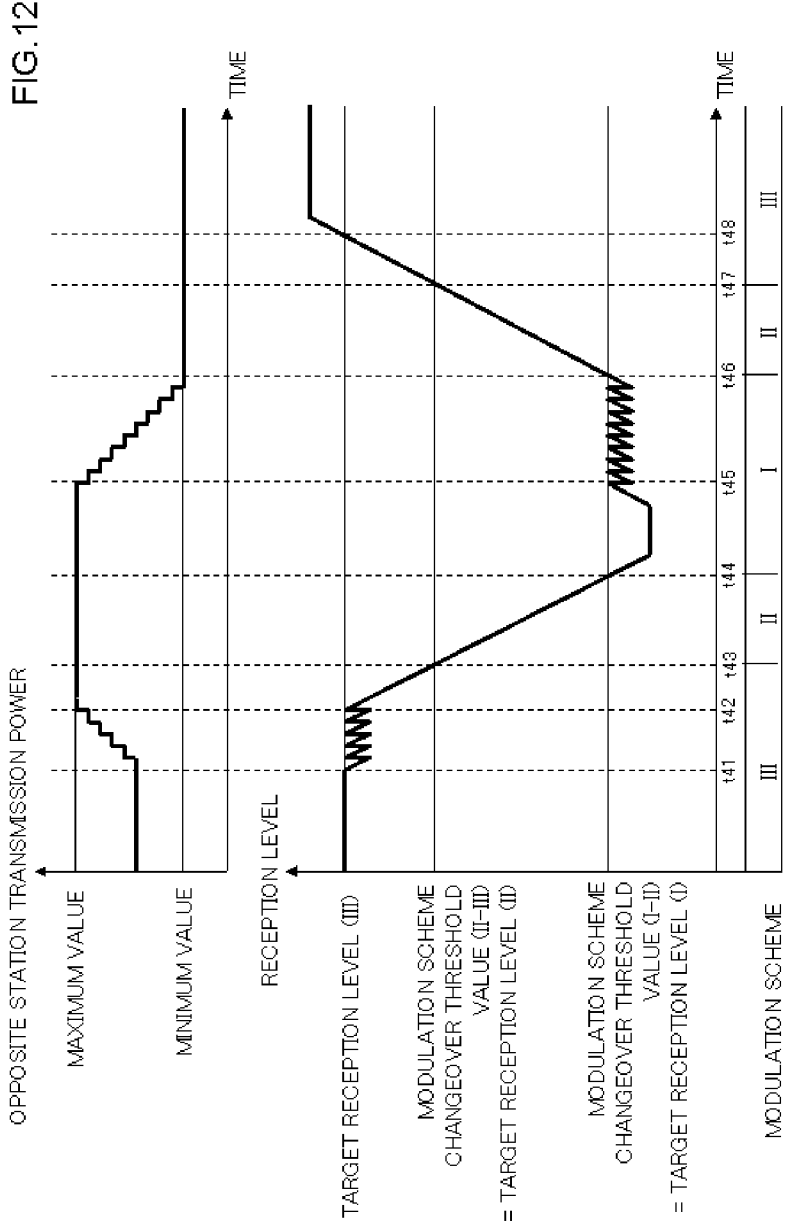
FIG. 12: A graph showing an operation of the adaptive modulation scheme of the fourth exemplary embodiment of the present invention.

FIG. 11 is a graph showing a corresponding relation of the reception level and the target reception level in the adaptive modulation scheme of the fourth exemplary embodiment of the present invention. FIG. 12 is a graph showing a time shift of the reception level and a variation in a transmission power of the transmitter and an applied modulation scheme when performing the adaptive modulation control in the fourth exemplary embodiment.

Because the structure of the communication device of the fourth exemplary embodiment is also the same as the communication device 10 of the first exemplary embodiment shown in FIG. 1, the description about its structure will be omitted. However, an operation in the designation information output unit is different from that of the communication device 10 of the first exemplary embodiment. The operation of the communication device of the fourth exemplary embodiment controlled by the designation information output unit of the communication device of the fourth exemplary embodiment will be described in detail in the following.

As shown in FIG. 11, in the adaptive modulation scheme of the fourth exemplary embodiment, the target reception level is set to be a numerical value equal to the modulation scheme changeover threshold value. The target reception level changes according to the modulation schemes applied at that time. In the following, an example of an operation will be described specifically by referring to FIG. 12.

In an initial state, the modulation scheme III is applied to the modulation scheme of the external transmitter. Because the transmission power is controlled by a predetermined value, the reception level is constant with the target reception level (III).

At that time, when the reception level is decreased to the extent below the target reception level (III) (time t41) owing to deterioration of the radio wave environment or the like, the communication device 10 requires the increase of the transmission power for the transmitter. Henceforth, while the reception level is lower than the target reception level (III), the communication device 10 continues to require the increase of the transmission power for the transmitter.

When the communication device 10 continues to require the increase of the transmission power, the transmission power of the transmitter eventually reaches the maximum value (t42). When the radio wave environment is deteriorated after that, the reception level is going to decline and the reception level falls below the modulation scheme changeover threshold value (II-III) at last (t43). At that time, the communication device 10 requests the transmitter to change its modulation scheme to the modulation scheme II. Further, the communication device 10 changes the target reception level to the target reception level (II).

Because the transmission power of the transmitter already reached the maximum value, it cannot compensate the decrease of the reception level by the increase of the transmission power. Therefore, when the reception level is decreased further to the extent below the modulation scheme changeover threshold value (I-II) (t44), the communication device 10 requests the transmitter to change its modulation scheme to the modulation scheme I. Further, the communication device 10 changes the target reception level to the target reception level (I).

Here, when the reception level rises due to a recovery or the like of the radio wave environment, and the reception level reaches the target reception level (I) (t49), the transmission power control as to the target reception level (I) is performed. That is, it is controlled that the communication device 10 requires the decrease of the transmission power for the transmitter so that the reception level reaches the target reception level (I). And after the transmission power reaches its minimum value, when the reception level rises and exceeding the modulation scheme changeover threshold value (I-II) (t46), the communication device requests the transmitter to change its modulation scheme to the modulation scheme II. Furthermore, the communication device 10 changes the target reception level to the target reception level (II).

When the reception level still rises and exceeds the modulation scheme changeover threshold value (II-III) (t47), the communication device requests the transmitter to change its modulation scheme to the modulation scheme III.

Furthermore, the communication device 10 changes the target reception level to the target reception level (III).

Because the transmission power has already been lowered to the minimum value, the reception level exceeds the target reception level after the increase of the reception level continues to reach the target reception level (III) (t48).

Advantage of the Exemplary Embodiment 4

As described above, in the communication device of the fourth exemplary embodiment, the target reception level is set so as to correspond to each modulation scheme. The target reception level is made equal to the threshold value of the reception level when changing the modulation scheme to the modulation scheme of the higher rank. Therefore, the communication device controls the transmission power so as not be equal to or beyond the reception level required to the current modulation scheme prior to changing over to the modulation scheme of the higher rank. Accordingly, it has an advantage that an electrical power-saving for the transmission power of the transmitter can be possible.

According to this exemplary embodiment, there are no cases that the increase to the transmission power more than necessary is required prior to changing over to the modulation scheme of the higher rank. Therefore, it is particularly effective when the communication device carries out the transmission power control so as to directly designate a numerical value of the transmission power or the increased width of the transmission power for the transmitter.

Even in the adaptive modulation scheme of this exemplary embodiment, it is always controlled so that the reception level rises.

Exemplary Embodiment 5

In the communication device of the first to fourth exemplary embodiments, the magnitude correlation between the modulation scheme changeover threshold value and the target reception level corresponding to the modulation scheme applied at that time is always the same. That is, the target reception level and the modulation scheme changeover threshold value are always either one of such cases that one is larger than the other or both of them are equal. In the communication device of the fifth exemplary embodiment, the magnitude correlation between the target reception level and the modulation scheme changeover threshold value is changed by the modulation scheme applied at that time.

Figure 13:
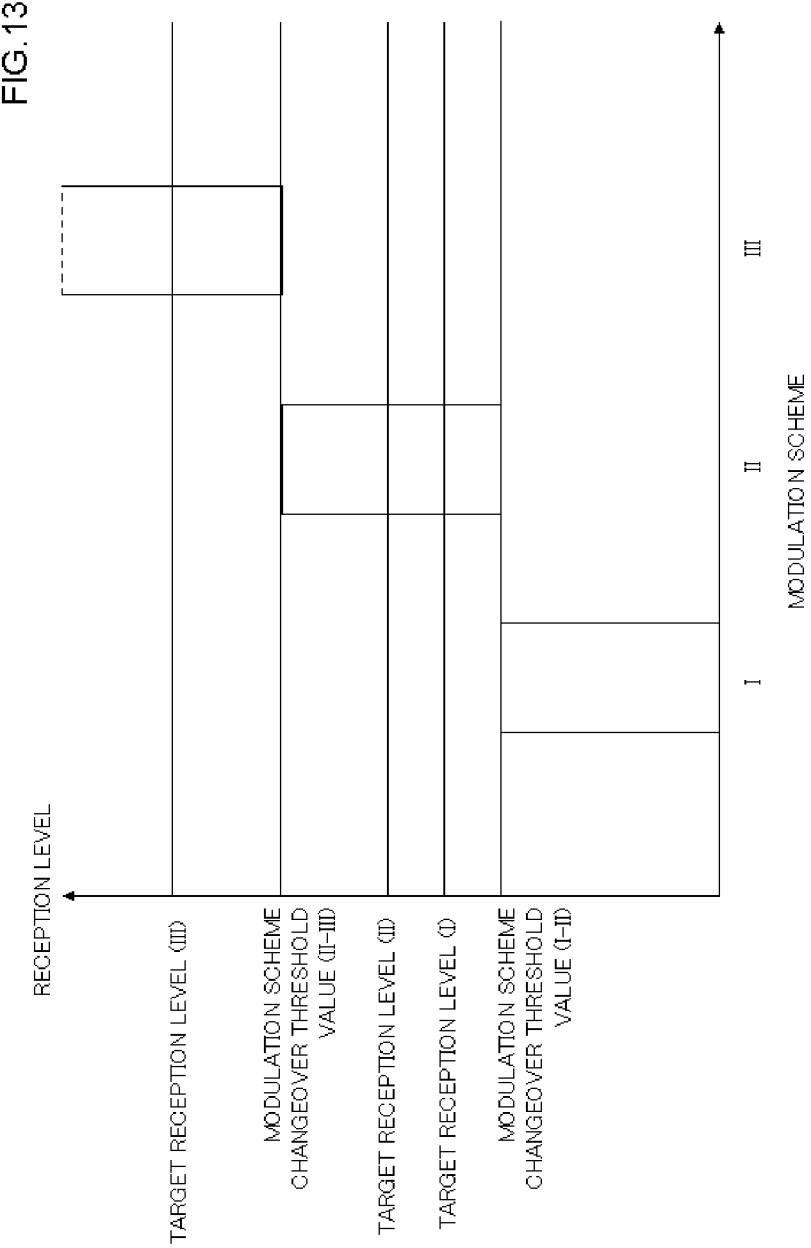
FIG. 13: A graph showing a corresponding relation of the reception level and the target reception level in the adaptive modulation scheme of a fifth exemplary embodiment of the present invention.
Figure 14:
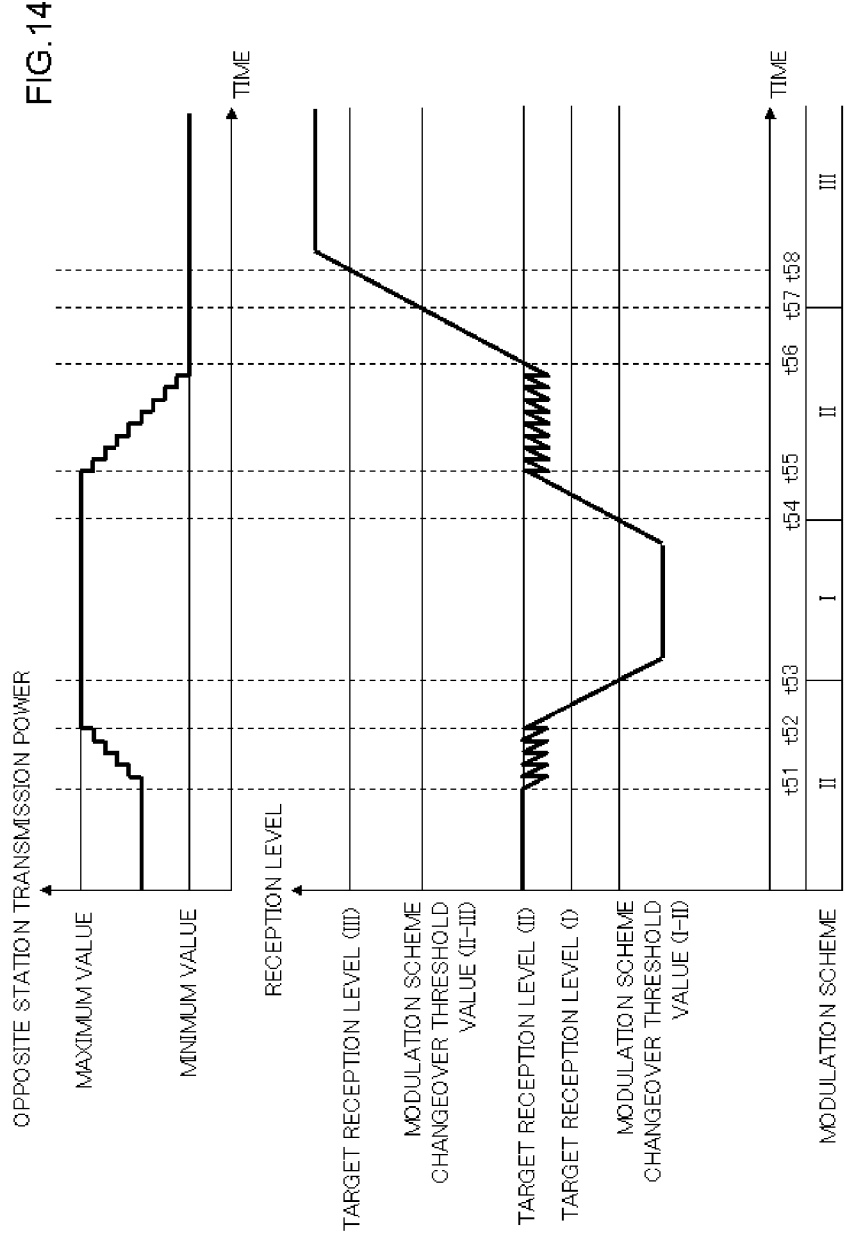
FIG. 14: A graph showing an operation of the adaptive modulation scheme of the fifth exemplary embodiment of the present invention.

FIG. 13 is a graph showing a corresponding relation of the reception level and the target reception level in the adaptive modulation scheme of the fifth exemplary embodiment of the present invention. FIG. 14 is a graph showing a time shift of the reception level and a variation in a transmission power of the transmitter and an applied modulation scheme when performing the adaptive modulation control in the fifth exemplary embodiment.

Because the structure of the communication device of the fifth exemplary embodiment is also the same as the communication device 10 of the first exemplary embodiment shown in FIG. 1, the description about its structure is omitted. However, an operation in the designation information output unit is different from that of the communication device 10 of the first exemplary embodiment. The operation of the communication device of the fifth exemplary embodiment controlled by the designation information output unit of the communication device of the fifth exemplary embodiment will be described in detail in the following.

As shown in FIG. 13, in the adaptive modulation scheme of the fifth exemplary embodiment, the magnitude correlation between the target reception level and the modulation scheme changeover threshold value changes depending on the modulation scheme. That is, the target reception level (I) is larger than the modulation scheme changeover threshold value (I-II). However, the target reception level (II) is smaller than the modulation scheme changeover threshold value (II-III). When the target reception level is set in this manner, its operation will be described specifically by referring to FIG. 14.

In the initial state, the modulation scheme II is applied to the modulation scheme of the external transmitter. Because the transmission power is controlled to the predetermined value, the reception level is constant with the target reception level (II).

At that time, when the reception level declines to the extent below the target reception level (II) (time t51) owing to deterioration of the radio wave environment or the like, the communication device 10 requires the increase of the transmission power for the transmitter. Henceforth, while the reception level is lower than the target reception level (II), the communication device 10 continues to require the increase of the transmission power for the transmitter.

When the communication device 10 continues to require the increase of the transmission power, the transmission power of the transmitter eventually reaches the maximum value (t52). When the radio wave environment is deteriorated after that, the reception level is going to decline and the reception level falls below the modulation scheme changeover threshold value (I-II) at last (t53). At that time, the communication device 10 requests the transmitter to change its modulation scheme to the modulation scheme II. Further, the communication device 10 changes its target reception level to the target reception level (I). The modulation scheme changeover threshold value (I-II) is set to be higher than the target reception level (I). Therefore, the communication device 10 always requires the increase of the transmission power so as to able to change over its modulation scheme to the modulation scheme II.

Here, when the reception level rises and exceeds the modulation scheme changeover threshold value (I-II) (t54), the communication device requests the transmitter to change its modulation scheme to the modulation scheme II. Further, the communication device 10 changes its target reception level to the target reception level (II).

When the reception level still rises and exceeds the target reception level (II) (time t55), the transmission power control for the target reception level target (II) is performed. That is, the communication device 10 requires the decrease of the transmission power for the transmitter.

In this manner, according to this exemplary embodiment, the transmission power control is carried out so that the modulation scheme may be maintained in the modulation scheme II.

When the reception level rises (t56) and exceeds the modulation scheme changeover threshold value (II-III) (t57) after the transmission power of the transmitter reaches the minimum value, the communication device requests the transmitter to change its modulation scheme to the modulation scheme III. Further, the communication device 10 changes its target reception level to the target reception level (III).

Because the transmission power has already been lowered to the minimum value, the reception level exceeds the target reception level after the increase of the reception level continues to reach the target reception level (III) (t58).

Advantage of the Exemplary Embodiment 5

As described above, in the communication device of the fifth exemplary embodiment, the magnitude correlation between the target reception level and the modulation scheme changeover threshold value is changed by the modulation scheme applied at that time. Therefore, a certain modulation scheme can be set as a reference modulation scheme (a standard modulation scheme). And when the rank of the applied modulation scheme is lower than the standard modulation scheme, the changeover to the standard modulation scheme is promoted. When the standard modulation scheme is applied, it is controlled so that the standard modulation scheme is maintained. When the radio wave environment is very favorable, the modulation scheme having higher rank than the standard modulation scheme is applied. To this end, the adaptive modulation scheme of this exemplary embodiment can be called a "standard modulation scheme selection method".

Exemplary Embodiment 6

Next, an exemplary embodiment assuming specific equipment is indicated. The sixth exemplary embodiment is an example of a communication system equipped with two radio transceivers.

Figure 15:
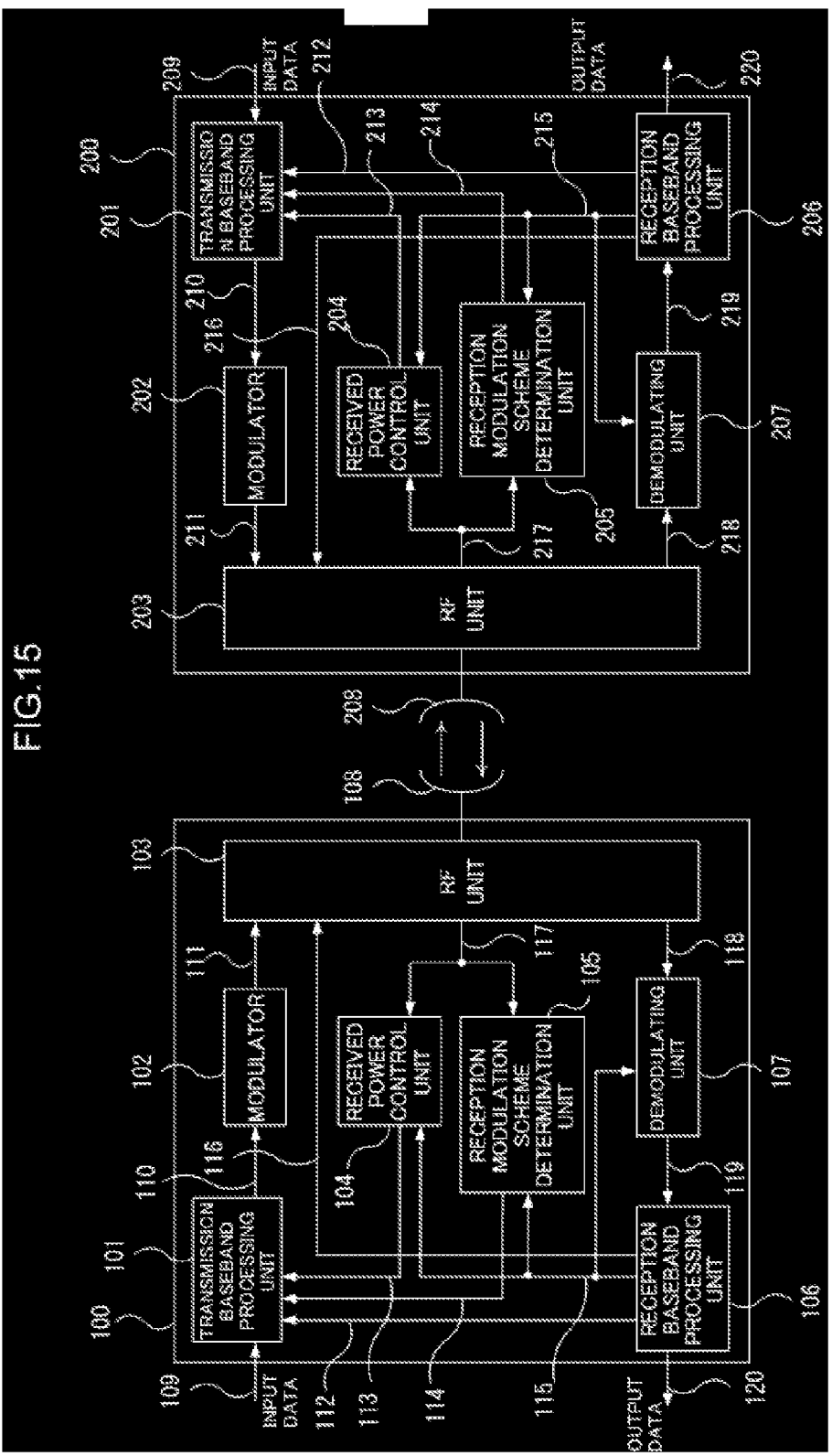
FIG. 15: A block diagram showing a structure of a communication system of a sixth exemplary embodiment of the present invention.

A structure of the communication system of the sixth exemplary embodiment is shown in FIG. 15. A radio communication system of the sixth exemplary embodiment includes a radio transceiver 100 and a radio transceiver 200. Because the radio transceiver 100 and the radio transceiver 200 have an identical structure, the structure of the radio transceiver 100 will be described hereinafter.

The radio transceiver 100 includes a transmission baseband processing unit 101, a modulator 102, a RF (Radio Frequency) unit 103, a received power control unit 104, a reception modulation scheme determination unit 105, a reception baseband processing unit 106, a demodulating unit 107 and an antenna 108.

Figure 18:
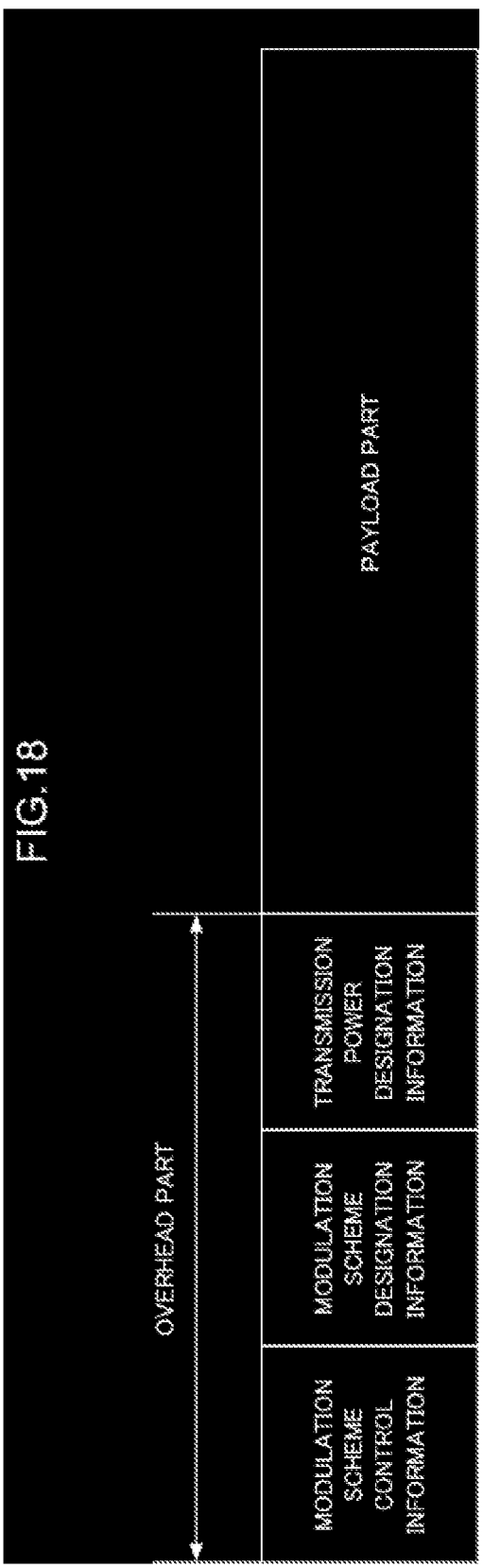
FIG. 18: A format diagram showing an example of a structure of a radio frame which is sent and received by the radio transceiver of the sixth exemplary embodiment of the present invention.

The transmission baseband processing unit 101 multiplexes various control information such as an input data 109, a modulation scheme control information 112, a transmission power designation information 113 and a modulation scheme designation information 114 in a radio frame shown in FIG. 18 and outputs to the modulator 102 as a transmission wireless frame data 110.

The modulator 102 modulates a transmission wireless frame data 110 inputted from the transmission baseband processing unit 101 according to the modulation scheme designation information stored in the overhead part of the transmission wireless frame data preceding one frame. And the modulated signal is outputted to the RF unit 103 as a transmission IF (Intermediate Frequency) signal 111.

The RF unit 103 carries out a frequency conversion which converts the input transmission IF signal 111 into a regulated radio frequency. Furthermore, the RF unit 103 carries out a transmission power control according to the transmission power control information 116 inputted from the reception baseband processing unit 106. And the RF unit 103 transmits a wireless signal, which is subjected to the frequency conversion and the transmission power control, to the radio transceiver 200 through the antenna 108.

The transmission power control information 116 is an information which represents whether the reception level in the radio transceiver 200 of the communication device 100 is no less than or less than the target reception level. When the transmission power control information 116 is '1', it means that in the radio transceiver 200 the reception level is less than the target reception level in a current modulation scheme. At that time, the RF unit 103 increases the transmission power. Conversely, when the transmission power control information 116 is '0', the RF unit 103 decreases the transmission power. The wireless signal with controlled transmission power in this manner is outputted to the antenna 108. Thus, by controlling the transmission power, the reception level in the radio transceiver 200 is controlled so as to be equal to the target reception level.

The RF unit 103 includes an automatic gain control function and a frequency converting function for the received wireless signal. The RF unit 103 receives the wireless signal transmitted from the radio transceiver 200 through the antenna 108. And the RF unit 103 carries out a level-control and a frequency conversion for the received wireless signal, and outputs it as a reception IF signal 118 to the demodulator 107.

The automatic gain control function of the RF unit 103 will be described more in detail. The RF unit 103 keeps the level of the reception IF signal 118 at a stipulated value and simultaneously presumes the level of the reception signal by using the control information which was used to carry out the automatic gain control. Then, the RF unit 103 outputs the level of the presumed reception signal as a reception level information 117 to the received power control unit 104 and the reception modulation scheme determination unit 105.

The demodulator 107 carries out a demodulation process for the reception IF signal 118 according to a reception modulation scheme control information 115 inputted from the reception baseband processing unit 106. And the demodulator 107 outputs the reception IF signal 118, which was carried out with the demodulation process, as a reception wireless frame data 119 to the reception baseband processing unit 106.

As mentioned above, the antenna 108 transmits the wireless signal from the RF unit 103 to the radio transceiver 200, and receives the wireless signal from the radio transceiver 200 to output it to the RF unit 103.

Figure 16:
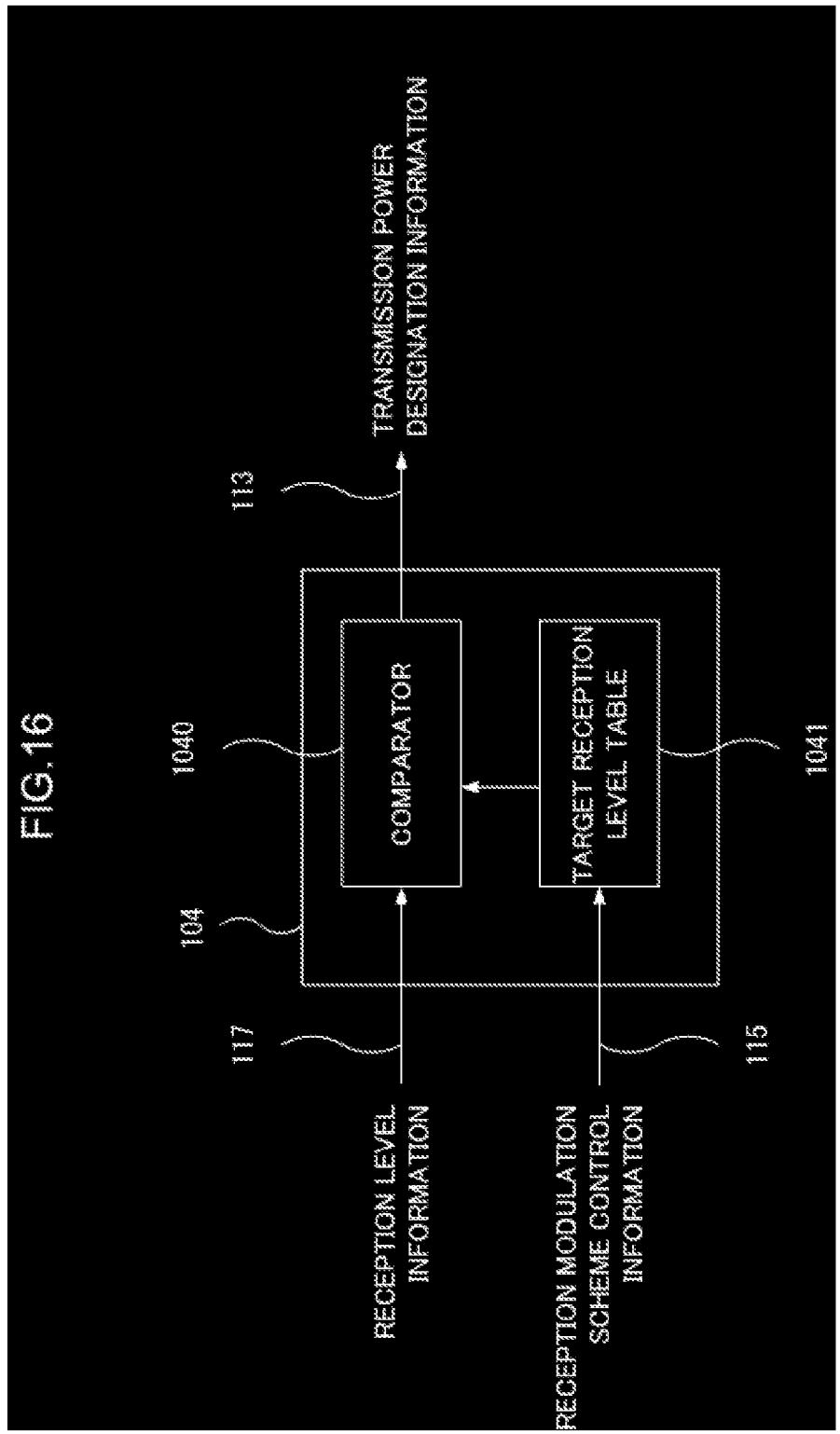
FIG. 16: A block diagram showing an example of a structure of a reception power control unit of a radio transceiver of the sixth exemplary embodiment of the present invention.

FIG. 16 is a block diagram showing an example of an exemplary embodiment of the received power control unit 104. A target reception level table 1041 output the corresponding target reception level to a comparator 1040 based on the reception modulation scheme control information 115 input from the reception baseband processing unit 106. The comparator 1040 compares the target reception level with the reception level information 117 inputted from the RF unit 103, and outputs a comparison result as the transmission power designation information 113 to the transmission baseband processing unit 101.

Figure 17:
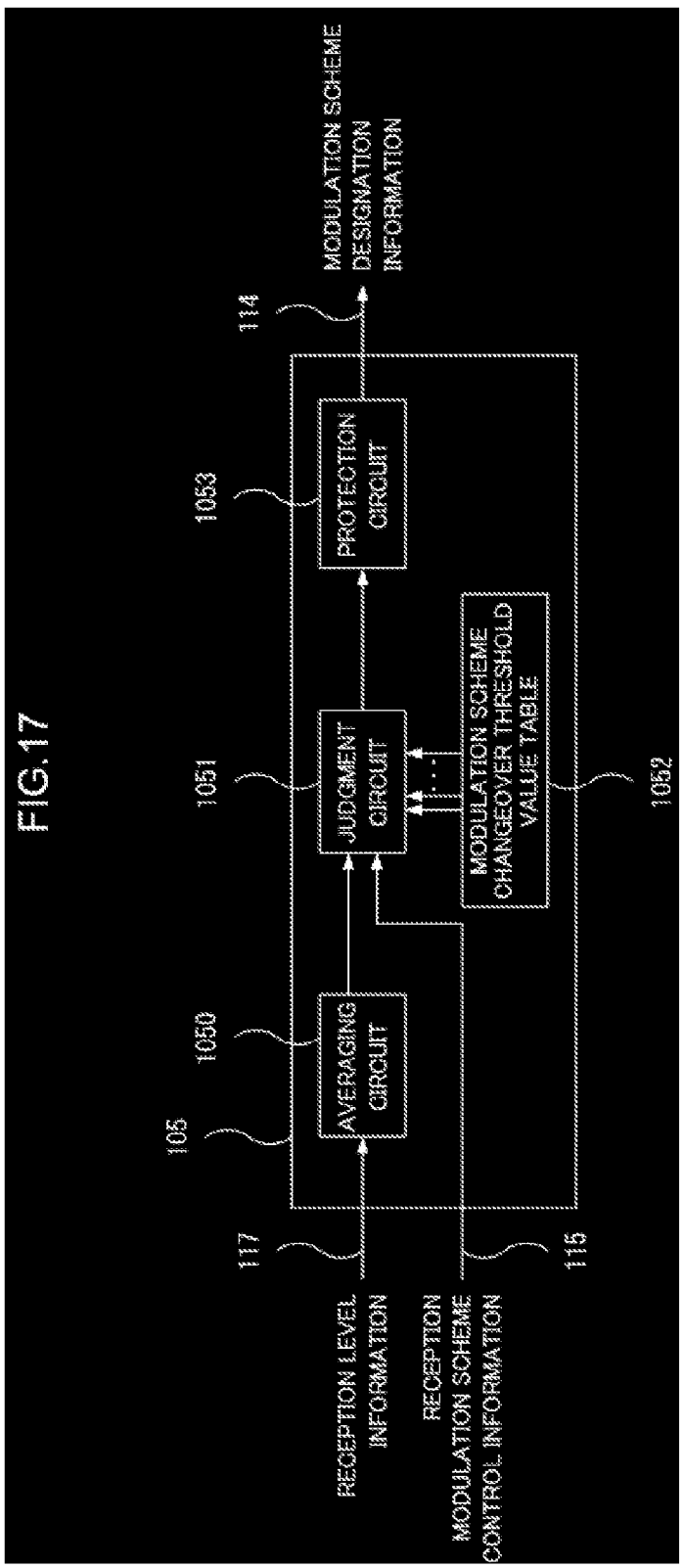
FIG. 17: A block diagram showing an example of a structure of a reception modulation scheme determining unit of a radio transceiver of the sixth exemplary embodiment of the present invention.

FIG. 17 is a block diagram showing an example of an exemplary embodiment of the reception modulation scheme determination unit 105. An averaging circuit 1050 averages a plurality of the reception level information 117 in a fixed period inputted from the RF unit 103, and outputs the average reception level that is its average value to a judgment circuit 1051. A modulation scheme changeover threshold value table 1052 outputs an upper limit threshold value and a lower limit threshold value in each modulation scheme to the judgment circuit 1051. The judgment circuit 1051 compares the average reception level input from the averaging circuit 1050 with the upper limit threshold value and the lower limit threshold value of each modulation scheme based on the reception modulation scheme control information 115 inputted from the reception baseband processing unit 106. And the judgment circuit 1051 determines the most suitable modulation scheme and outputs its result to a protection circuit 1053. The protection circuit 1053 identifies that the modulation scheme determination results inputted from the judgment circuit 1051 are continuously the same results with a predetermined number of times, and thereby making it as a final identification result. And then, the identification result as the modulation scheme designation information 114 is outputted to the transmission baseband processing unit 101.

As to the protection circuit 1053 will be described further. The protection circuit 1053 judges that the determination result is a subsequent modulation scheme suited for the present transmission path state if the same determination results were obtained continuously with a predetermined number of times. And the protection circuit 1053 outputs the modulation scheme of the determination results as the modulation scheme designation information 114 to the transmission baseband processing unit 101. In this manner, an averaging process is carried out to the input reception level information, and the modulation scheme determination is carried out by using the average result, and then a predetermined protection term is provided for the determination result. By providing the protection term, it is possible to prevent a repeated changing over of the modulation schemes in response to a sudden change in the transmission path state.

The reception baseband processing unit 106 extracts the modulation scheme designation information of the radio transceiver 200 which is multiplexed with the reception wireless frame data 119 after generated in the reception modulation scheme determination unit 205 of the radio transceiver 200 from the input reception wireless frame data 119, and outputs to the transmission baseband processing unit 101 as the modulation scheme control information 112 of the radio transceiver 100. The reception baseband processing unit 106 also extracts the transmission power designation information of the radio transceiver 200 which is multiplexed with the reception wireless frame data 119 after generated in the received power control unit 204 of the radio transceiver 200, and outputs to the RF unit 103 as the transmission power control information 116 of the radio transceiver 100. Furthermore, the reception baseband processing unit 106 extracts the modulation scheme control information from the reception wireless frame data 119 and outputs to the received power control unit 104, the reception modulation scheme determination unit 105 and the demodulator 107 as the reception modulation scheme control information 115. And the reception baseband processing unit 106 outputs a payload data multiplexed to the reception wireless frame data 119 as an output data 120.

The function of the above-mentioned structure of the radio transceiver 100 and each component is also common to the radio transceiver 200. In FIG. 15, the most significant digit of the reference number attached to each component of the radio transceiver 100 and a signal used inside the radio transceiver 100 is unified by "1". As for the radio transceiver 200, the most significant digit of the reference number attached to each component of the radio transceiver 100 and a used signal is changed to "2", and all the same numbers are used for the other digits. For example, an antenna of the radio transceiver 200 corresponding to the antenna 108 of the radio transceiver 100 is indicated as an antenna 208.

Next, an operation of this exemplary embodiment will be described with reference to FIG. 15. In the following description, for convenience, the radio transceiver 100 is called as a "local station", and the radio transceiver 200 is called as an "opposite station". As shown in FIG. 15, the opposite station has an identical structure with the local station. By performing an identical operation, the local station and the opposite station are sending and receiving signals with each other. Therefore, in the following, only an operation of the local station will be described.

First, in the adaptive modulation scheme of this exemplary embodiment, an operation when adopting the standard modulation scheme selection method will be described.

Figure 19:
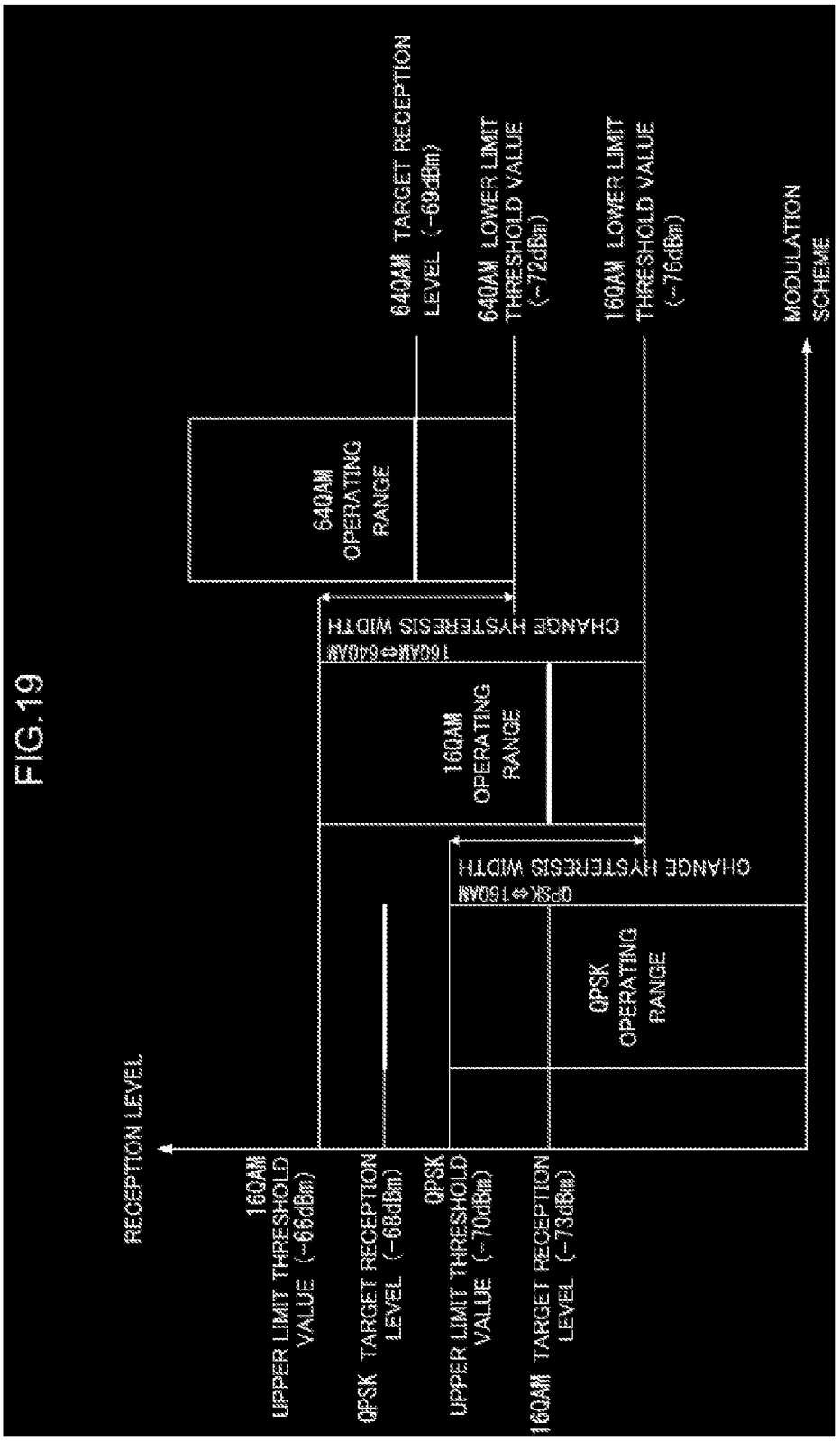
FIG. 19: A graph showing a corresponding relation of the reception level and the target reception level when adopting a standard modulation scheme selection method in the adaptive modulation scheme of the sixth exemplary embodiment of the present invention.

An operation of the received power control unit 104 will be described with reference to FIG. 16. In the target reception level table 1041, the target reception level corresponding to each modulation scheme is stored in advance. The target reception level table 1041 outputs the corresponding target reception level to the comparator 1040 according to input reception modulation scheme control information 115. As shown in FIG. 19, in a modulation scheme with the small modulation multi-level number less than a standard modulation scheme, the target reception level is set to the level higher than the upper limit threshold value for a modulation scheme changeover. On the other hand, in the modulation scheme not less than the standard modulation scheme, the target reception level is set to the level of the middle of the upper limit threshold value and the lower limit threshold value. The comparator 1040 compares the input reception level information 117 with the target reception level. And when the reception level information 117 is not less than the target reception level, '0' is outputted, while it is less than the target reception level, '1' is outputted to the transmission baseband processing unit 101 as the transmission power designation information 113.

Next, an operation of the reception modulation scheme determination unit 105 will be described with reference to FIG. 17. The averaging circuit 1050 averages a plurality of the reception level information 117 inputted in a fixed period and outputs its result to the judgment circuit 1051. The judgment circuit 1051 determines the modulation scheme designation information in view of the reception modulation scheme control information 115 and the upper limit threshold value/lower limit threshold value of each modulation scheme supplied from the modulation scheme changeover threshold value table 1052, and outputs it to the protection circuit 1053.

Here, in the modulation scheme determination processing, a reason that the reception modulation scheme control information is needed will be described. As shown in FIG. 19, pluralities of applicable modulation schemes exist for a range of a certain reception level. This is because a hysteresis characteristic is given to the a modulation scheme determination in the changeover of the modulation schemes by independently setting the threshold value (the upper limit threshold value) in the case of changing over the modulation multi-level number toward increasing direction and the threshold value (the lower limit threshold value) in the case of changing over the modulation multi-level number toward decreasing direction. Owing to this, even if the reception level fluctuates around the threshold value, it is possible to prevent that the modulation scheme frequently changes over.

In order to give the hysteresis characteristic, the determination result needs to be changed by the modulation scheme at that time in a range of the reception level to which a plurality of modulation schemes can be applied. For example, in a case that the reception level is −74 dBm, when the current modulation scheme is QPSK (Quadrature Phase Shift Keying) or 16 QAM (Quadrature Amplitude Modulation), the QPSK or the 16 QAM is outputted as the determination result just as it is. However, when the current modulation scheme is the 64 QAM, because it is less than the lower limit threshold value of the 64 QAM, the 16 QAM is outputted as the determination result.

By using a wireless frame format shown in FIG. 18, a mechanism of changing over the modulation schemes will be described from the transmission baseband processing unit 101 of the local station to the reception baseband processing unit 206 of the opposite station. The transmission wireless frame data 110 is that the radio frames shown in FIG. 18 are continued in terms of time. In order to carry out the modulation scheme changeover with hitless, that is, without intermittent discontinuity, the modulation scheme changeover is carried out by the radio frame unit. Accordingly, the modulation scheme of a certain radio frame is indicated by the modulation scheme control information included in the overhead part of a previous one frame. This is because, in the demodulator 207 of the opposite station, it is necessary to know a timing of the modulation scheme changeover in advance. In the opposite station, it is possible to know for the first time which scheme is the modulation scheme applied to the certain reception radio frame by demodulating the reception IF signal 218 in the demodulator 207. However, in order to obtain a right reception wireless frame data by demodulating the reception IF signal 218, it is necessary to know its modulation scheme in advance. Therefore, the modulation scheme control information should express the modulation scheme of the subsequent radio frame rather than the modulation scheme of the radio frame including itself.

An operation of the modulation scheme judgment and the transmission power control as an entire system performed based on the above mentioned function and operation of each part will be described with reference to FIG. 19 and FIG. 20. The modulation scheme judgment and the transmission power control are carried out by an identical operation independently in a direction from the local station to the opposite station and a direction from the opposite station to the local station, respectively. In the following, it will be described about the modulation scheme and the transmission power control as an example in the direction from the opposite station to the local station.

FIG. 19 represents the target reception level and the upper limit/lower limit threshold value for the modulation scheme changeover in each modulation scheme. FIG. 20 represents variation of the reception level of the local station, the target reception level, the attenuation of the transmission path and the transmission power of the opposite station in terms of time, and the modulation scheme determined by the local station side according to that.

Figure 20:
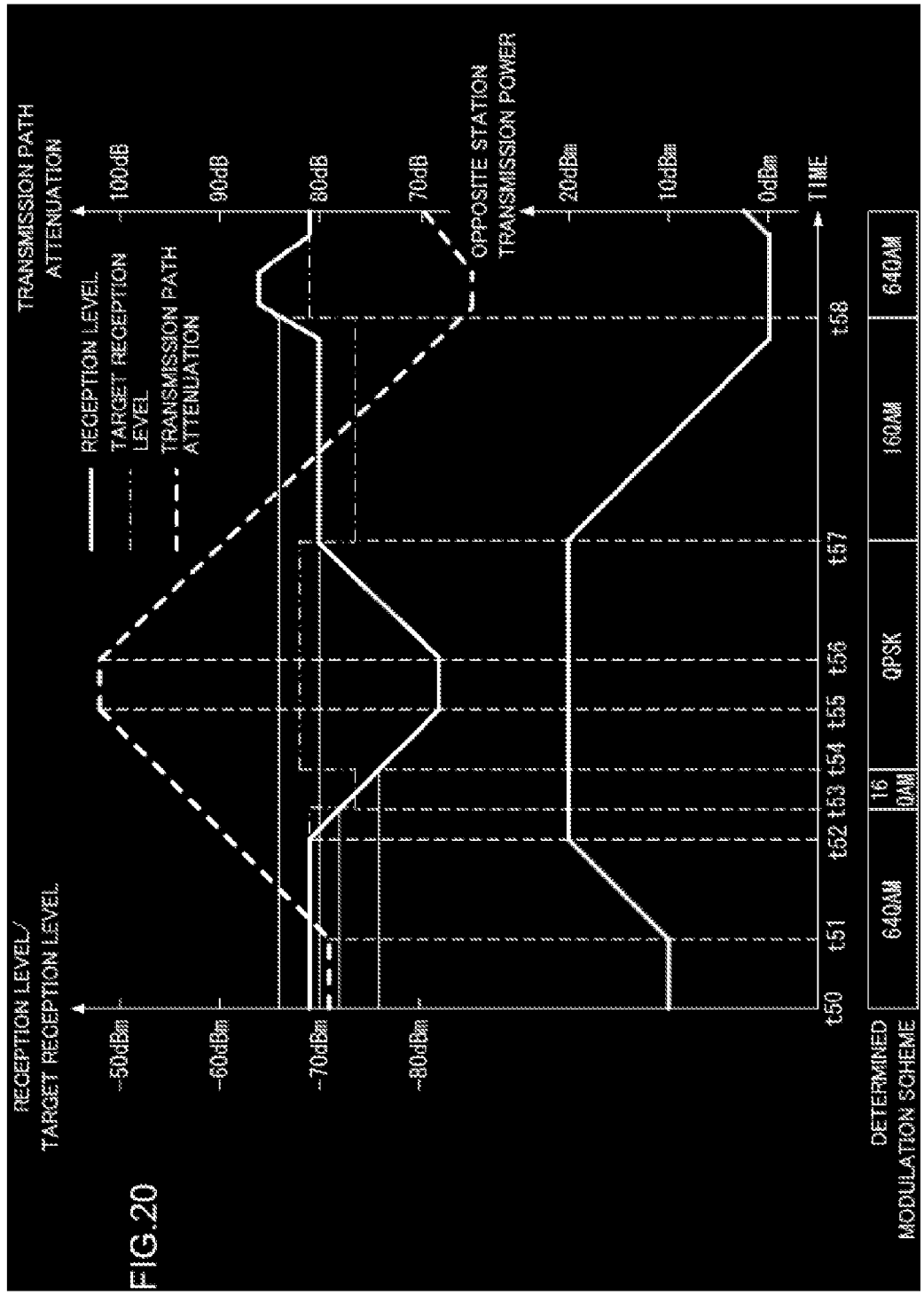
FIG. 20: A graph showing an operation in the adaptive modulation scheme of the sixth exemplary embodiment of the present invention, when adopting a standard modulation scheme selection method.

In FIG. 20, it is supposed that the transmission power control range of the opposite station is 0-20 dBm. At the time t50 that is an initial state, the transmission power of the opposite station is 10 dBm, the attenuation of the transmission path is 79 dB and the reception level of the local station is −69 dBm. It is supposed that the modulation scheme of the initial state is 64 QAM. FIG. 19 shows that this reception level is in the operating range of the 64 QAM. Accordingly, the 64 QAM is outputted as the modulation scheme designation information.

After that, during the time t51 and t52, the transmission path attenuation increases gradually (that is, the transmission path state degrades). Because the transmission power of the opposite station also increases according to that, the reception level of the local station is maintained at −69 dBm which is the numerical value of the target reception level of the 64 QAM. Actually, the transmission power of the opposite station and the reception level of the local station between t51 and t52 indicate a variation indicated between t11 and t12 in FIG. 4. That is, the transmission power indicates a variation waveform of a stair-like, and the reception level indicates a variation waveform of a saw wave like. In the following, it is also similar as to the variation waveforms of the transmission power of the opposite station and the reception level of the local station during the transmission power control is operating effectively.

However, although the transmission path attenuation is continuously increased after the time t52, the transmission power of the opposite station reaches 20 dBm which is the maximum value at the time t52. Therefore, the transmission power of the opposite station is not able to be raised than this. Accordingly, between the time t52 and t55, because the reception level of the local station cannot be maintained with the numerical value of the target reception level, the reception level decreases.

At the time t53, because the reception level falls below −72 dBm which is the minimum threshold value of the 64 QAM, the 16 QAM is outputted as the modulation scheme designation information. At the time t54, because the reception level falls below −76 dBm which is the minimum threshold value of the 16 QAM, the QPSK is outputted as the modulation scheme designation information.

After the time t56, the propagation path attenuation is going to decrease gradually (that is, the propagation path state is improved). At the time t57, because the reception level of the local station exceeds −70 dBm which is the upper limit threshold value of the QPSK, the 16 QAM is outputted as the modulation scheme designation information. In addition, at the time t57, because the reception level exceeds the target reception level, the transmission power of the opposite station is controlled in a direction toward decreasing until the reception level becomes equal to the target reception level.

At the time t58, because the reception level exceeds −66 dBm which is the upper limit threshold value of the 16 QAM, the 64 QAM is outputted as the modulation scheme designation information.

Next, in the adaptive modulation scheme of this exemplary embodiment, an operation when adopting the highest rank modulation scheme selection method will be described.

Figure 21:
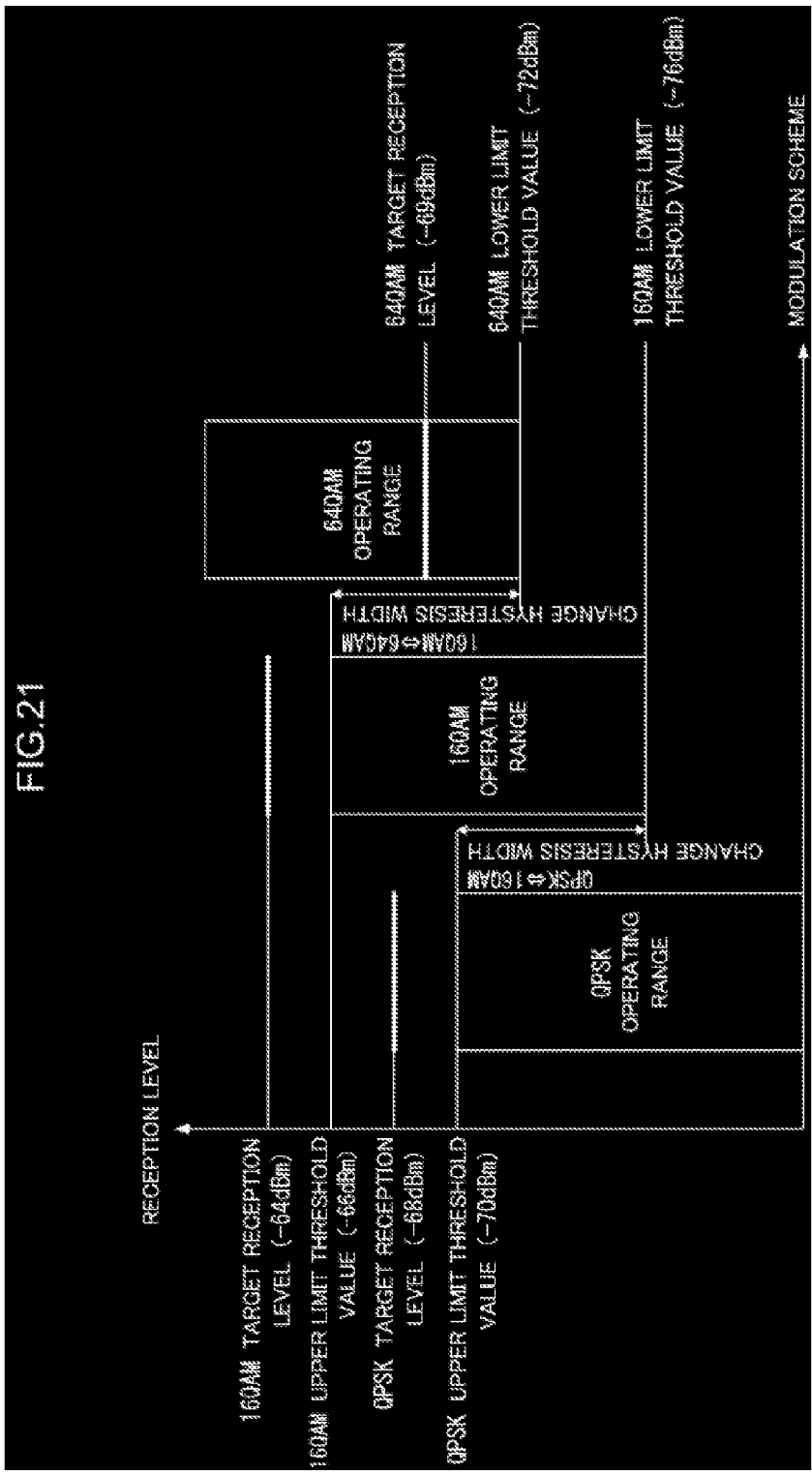
FIG. 21: A graph showing a corresponding relation of the reception level and the target reception level when adopting the highest rank modulation scheme selection method in the adaptive modulation scheme of the sixth exemplary embodiment of the present invention.
Figure 22:
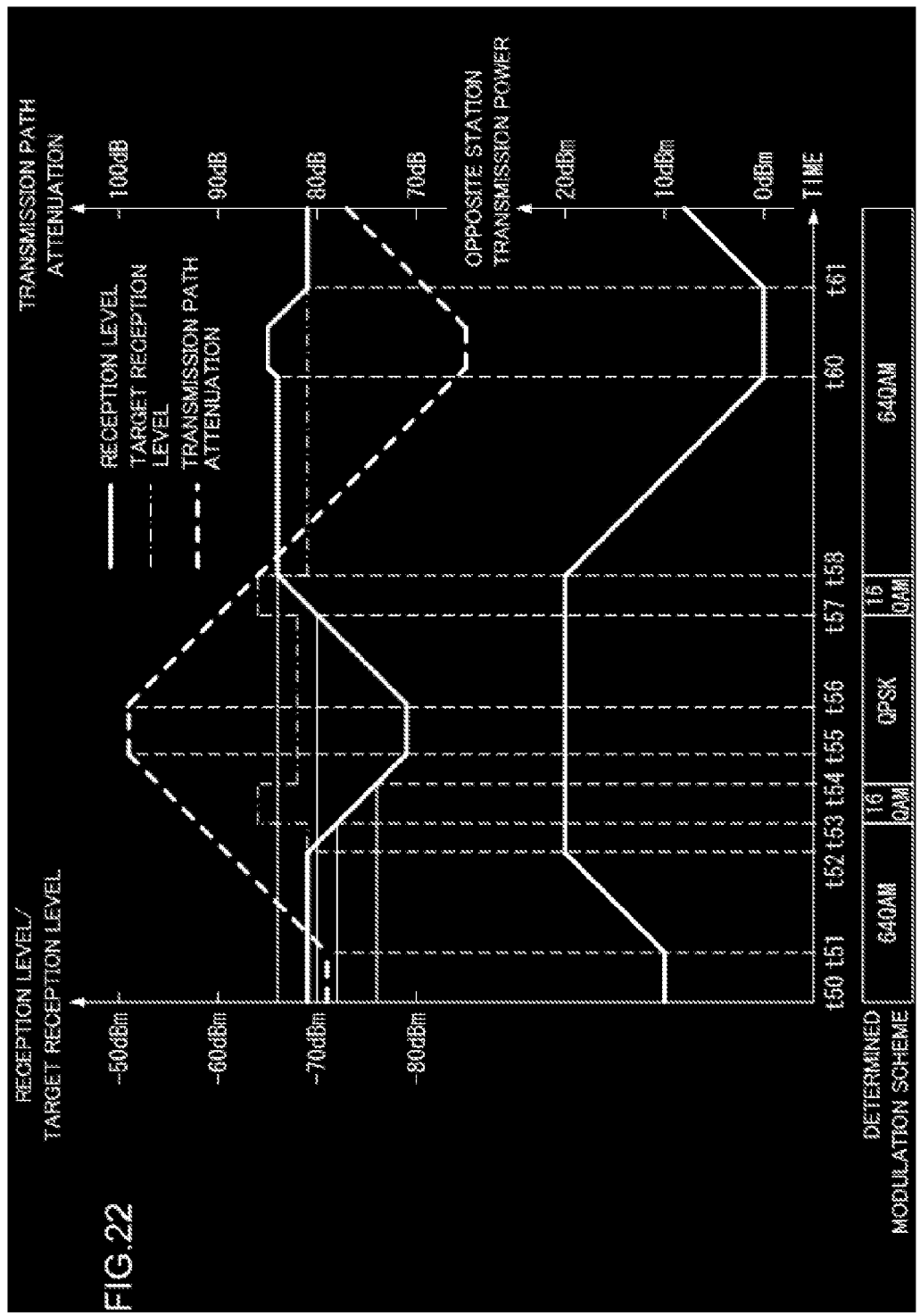
FIG. 22: A graph showing an operation when adopting the highest rank modulation scheme selection method in the adaptive modulation scheme of the sixth exemplary embodiment of the present invention.

In the adaptive modulation scheme of this exemplary embodiment, FIG. 21 represents the target reception level and the upper limit/lower limit threshold value for the modulation scheme changeover in each modulation scheme when adopting the highest rank modulation scheme selection method. FIG. 22 represents variation of the reception level of the local station, the target reception level, the attenuation of the transmission path and the transmission power of the opposite station in terms of time, and the modulation scheme determined by the local station side according to that.

The operation of the adaptive modulation scheme using the highest rank modulation scheme selection method is mostly the same as the adaptive modulation scheme using the standard modulation scheme selection method shown in FIG. 20. However, when the reception level exceeds the target reception level, the transmission power is deteriorated (t60), until the transmission power will be the lowest value of 0 dBm. And when the reception level falls to the target reception level (t61), the transmission power control is started again so that the reception level may be identical with the target reception level.

Figure 23:
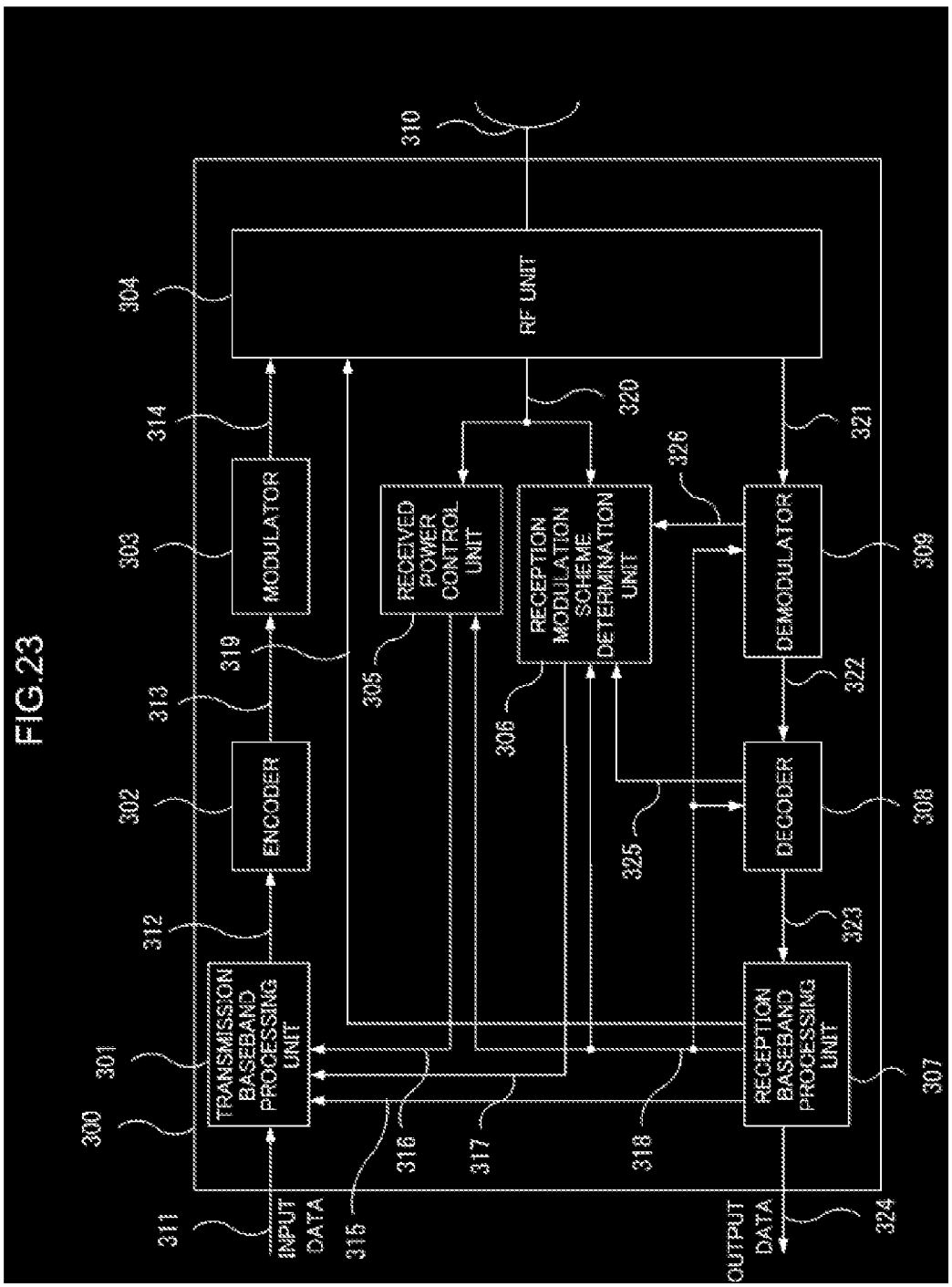
FIG. 23: A block diagram showing a structure of a modification of the radio transceiver of the sixth exemplary embodiment of the present invention.

A structure of a modification of the radio transceiver of the sixth exemplary embodiment is shown in FIG. 23. In FIG. 23, an encoder 302 and a decoder 308 are added to the sixth exemplary embodiment of FIG. 15. A transmission wireless frame data 312 is encoded in the encoder 302 and is outputted to a modulator 303 as a coded transmission wireless frame data 313. A coded reception wireless frame data 322 is decoded in the decoder 302 and is outputted to a reception baseband processing unit 307 as a reception wireless frame data 323.

As to the reception modulation scheme determination unit 306, a reception CNR information 326 is outputted from a demodulator 309 and an error pulse 325 is output from the decoder 308. In this way, in the determination of the reception modulation scheme, not only the reception level information but also the reception CNR information generated in the demodulator and the error rate information by the error correction processing may be used.

Figure 24:
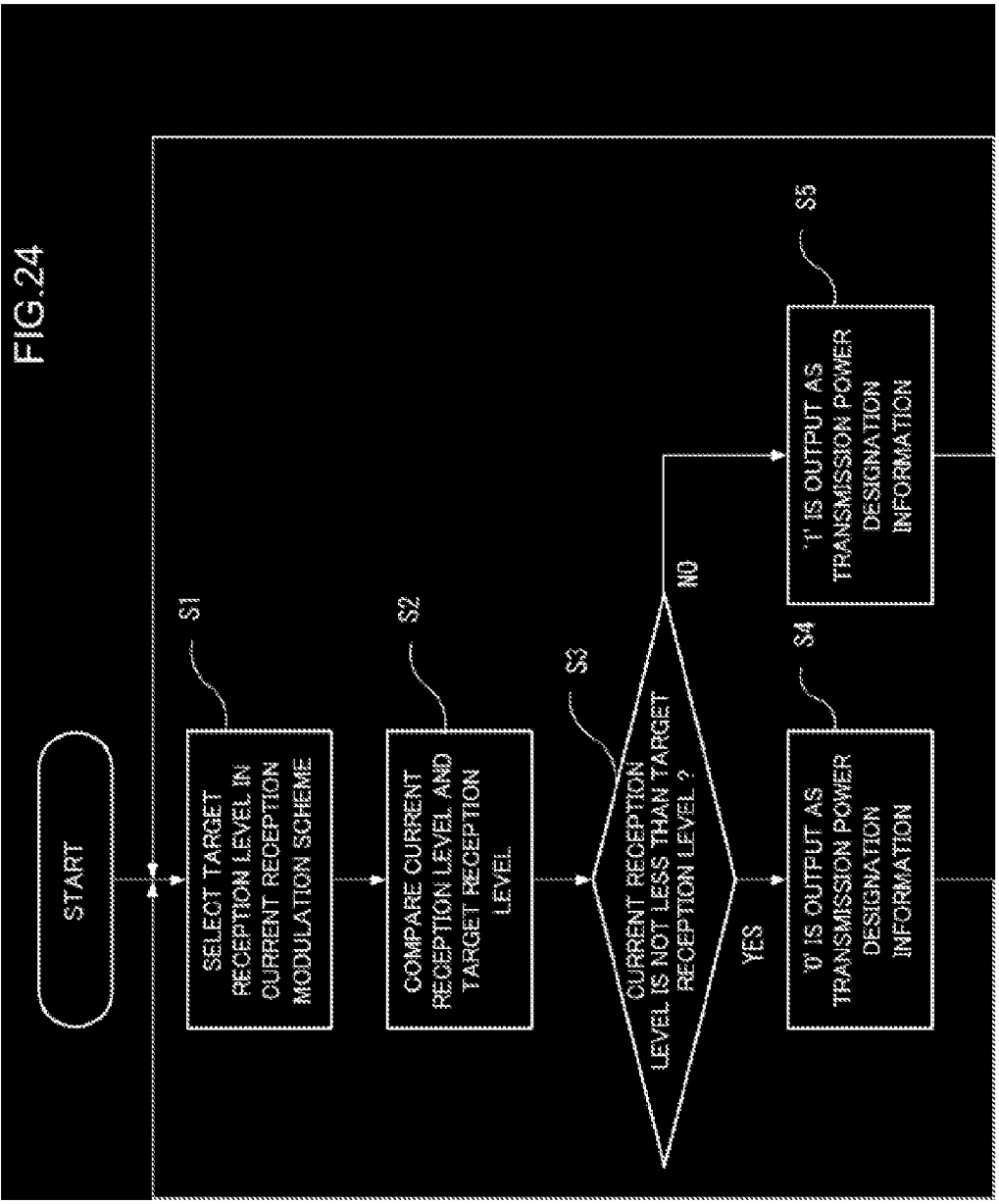
FIG. 24: An example of a flowchart showing a process of a received power control unit of the radio transceiver of the sixth exemplary embodiment of the present invention by using software.
Figure 25:
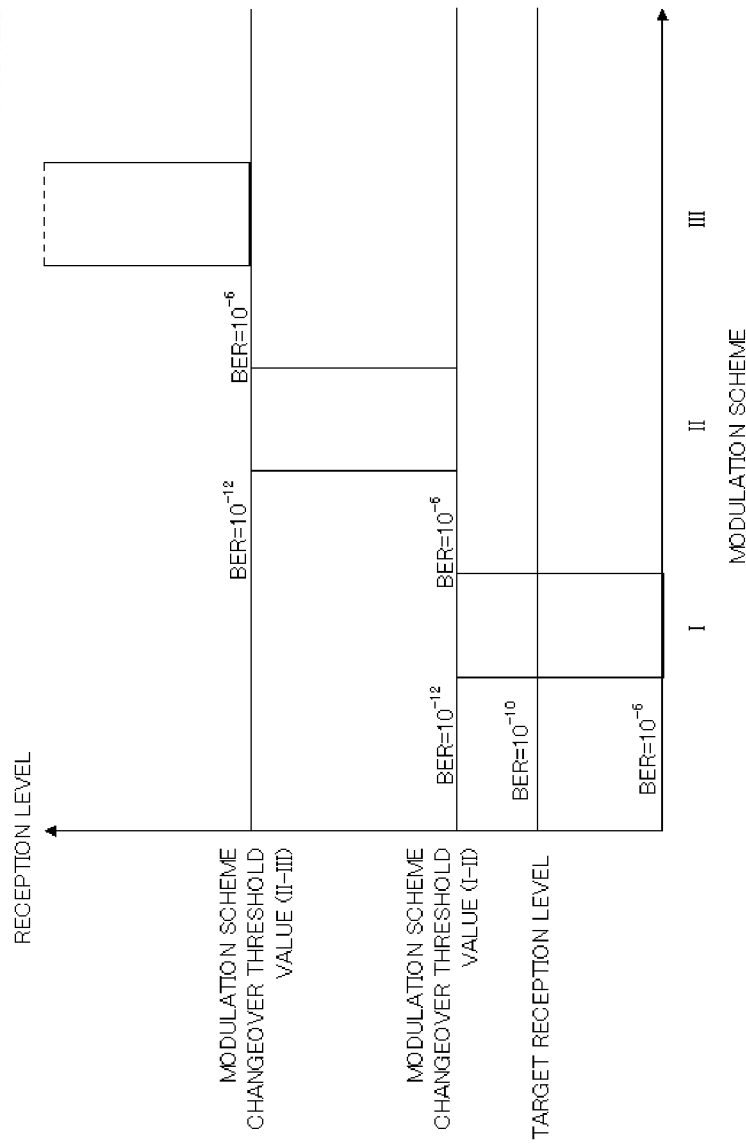
FIG. 25: A graph showing an example of a corresponding relation of the reception level, the modulation scheme and the target reception level in the adaptive modulation scheme.
Figure 26:
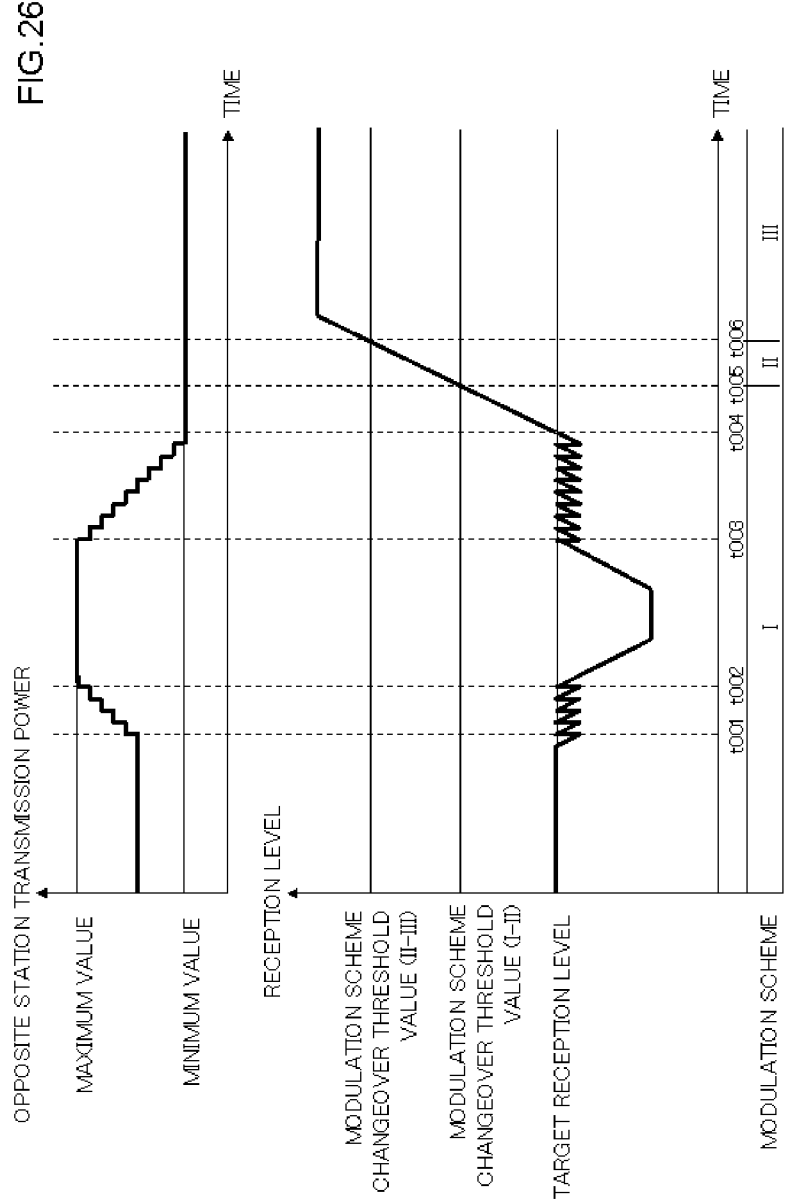
FIG. 26: A graph showing an example of an operation of the adaptive modulation scheme of FIG. 25.
Figure 27:
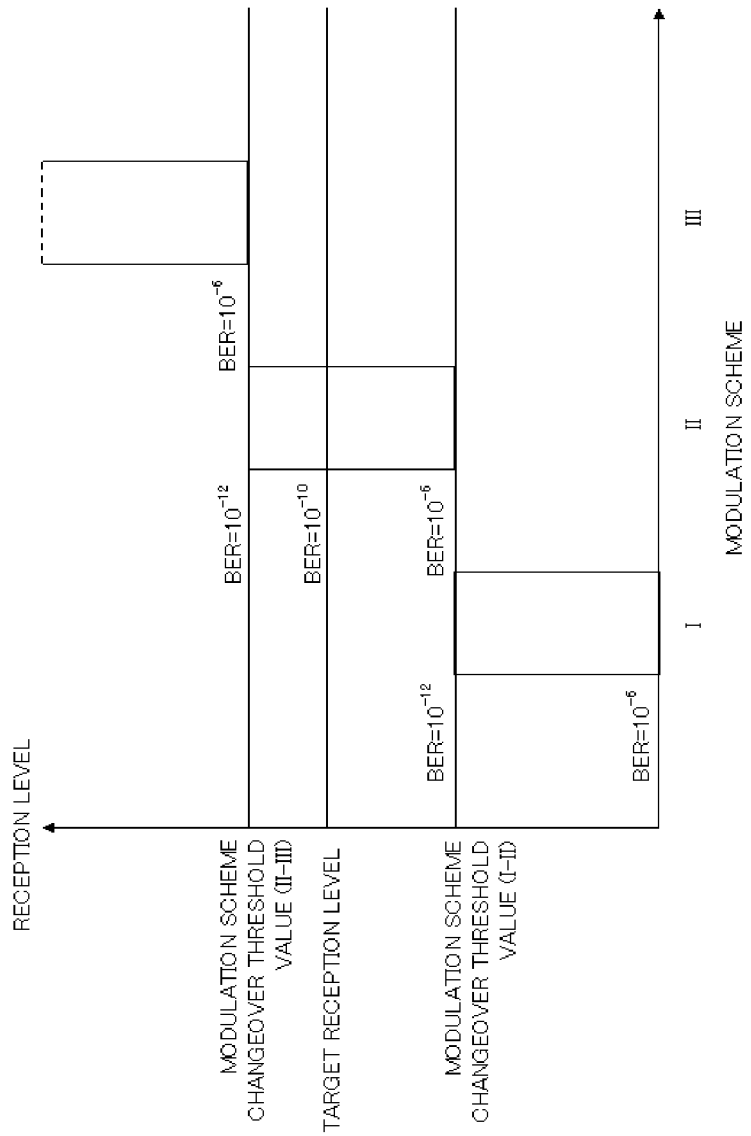
FIG. 27: A graph showing other examples of a corresponding relation of the reception level, the modulation scheme and the target reception level in the adaptive modulation scheme.
Figure 28:
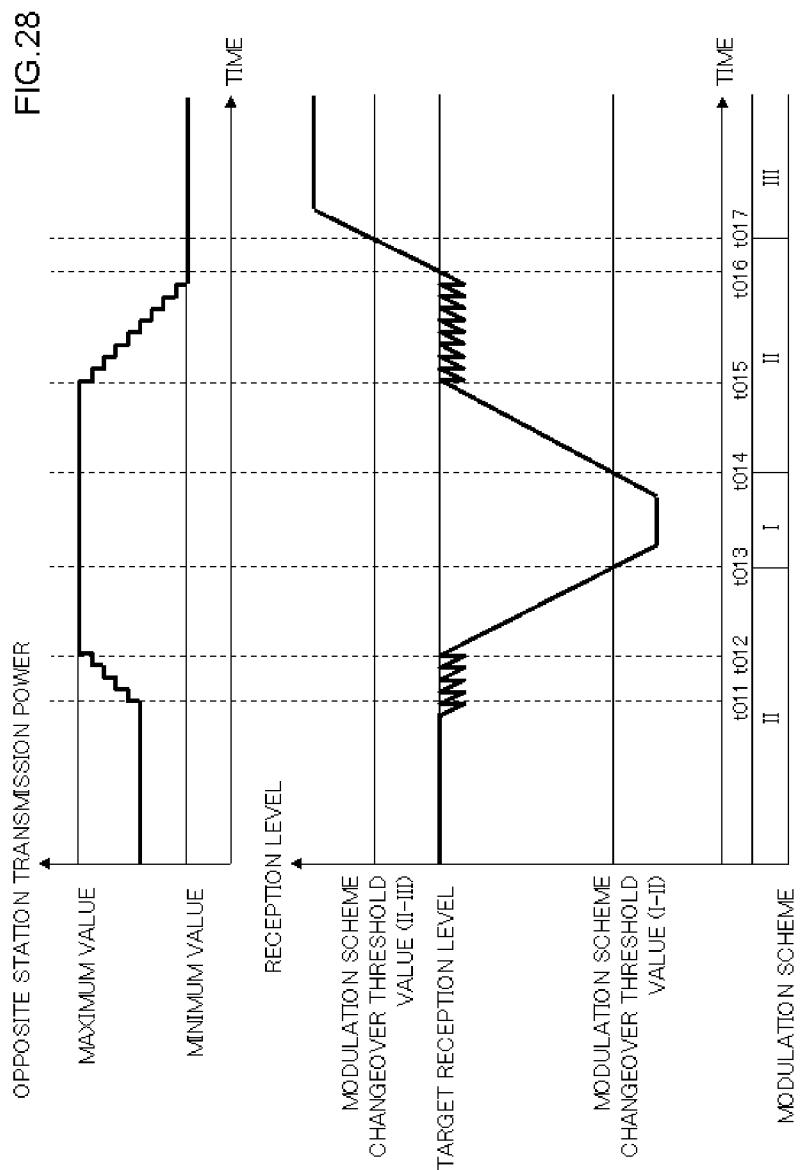
FIG. 28: A graph showing an example of an operation of the adaptive modulation scheme of FIG. 27.
Figure 29:
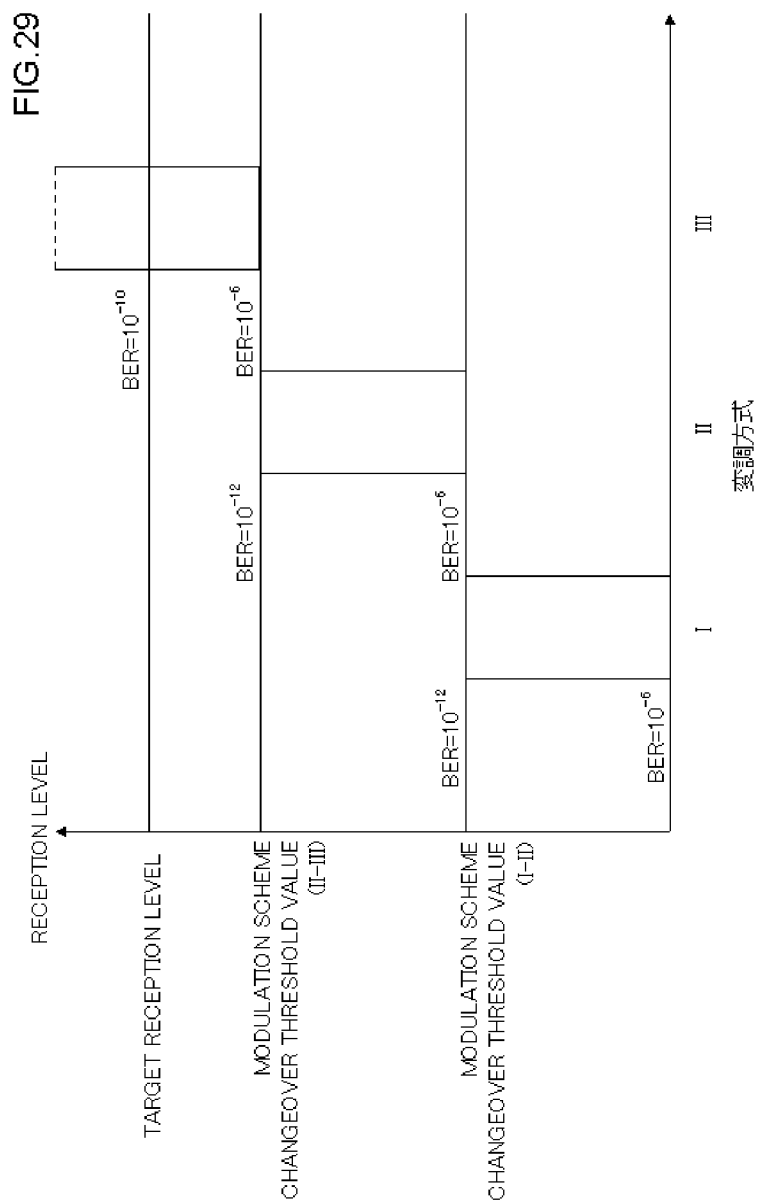
FIG. 29: A graph showing other examples of a corresponding relation of the reception level, the modulation scheme and the target reception level in the adaptive modulation scheme.
Figure 30:
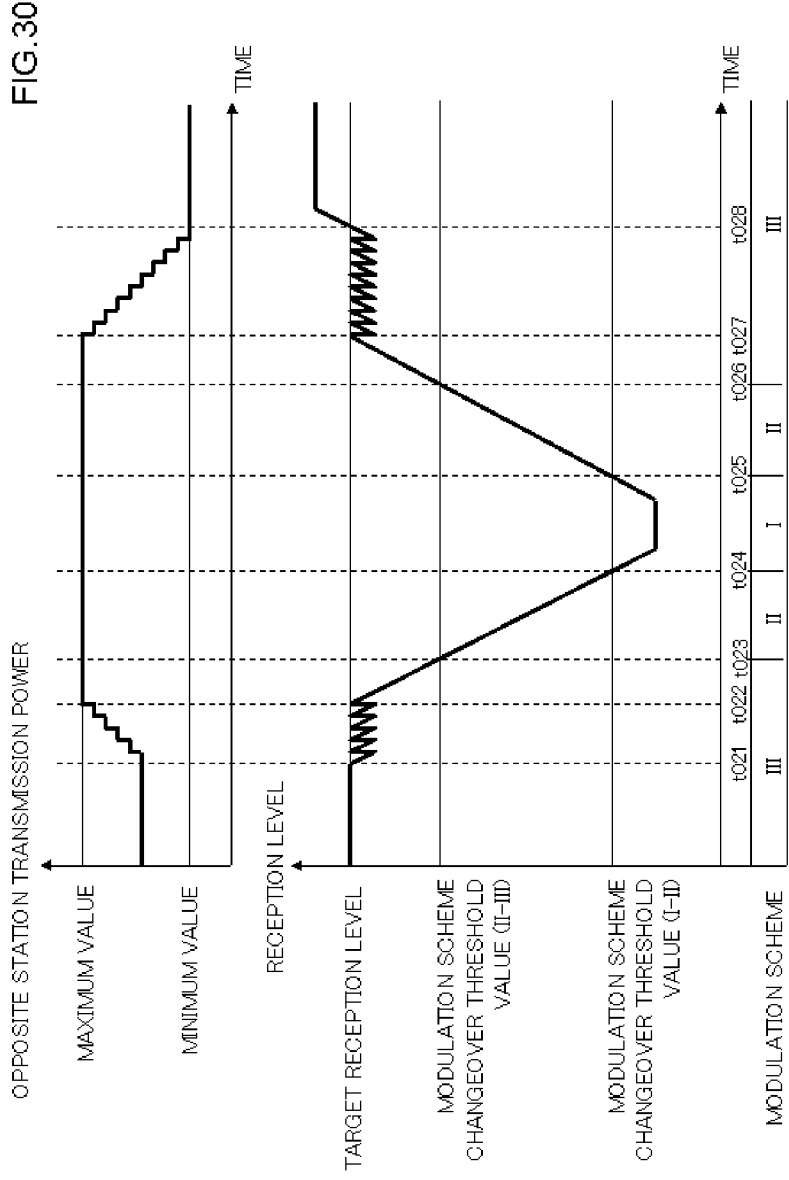
FIG. 30: A graph showing an example of an operation of the adaptive modulation scheme of FIG. 29.

Further, a processing of the received power control unit 104 in the sixth exemplary embodiment may be carried out by using a built-in computer and software within the radio transceiver 100. An example of a flowchart when carrying out a processing of the received power control unit 104 by using the software is shown in FIG. 24.

The flowchart in FIG. 24 will be described. The received power control unit 104 selects the target reception level in the current reception modulation scheme in the beginning (Step S1). Next, the received power control unit 104 compares the current reception level and the target reception level (Step S2).

And when the current reception level is not less than the target reception level (Step S3: Yes), '0' is outputted as the transmission power designation information (Step S4). When the current reception level is less than the target reception level (Step S3: No), '1' is outputted as the transmission power designation information (Step S5). And henceforth, the processing from Step S1 is repeated.

Similarly, a processing of the reception modulation scheme determination unit 104 may also be realized by the software. When the processing of the reception modulation scheme determination unit 104 is realized by the software, the modulation scheme changeover threshold value is used instead of the target reception level in the Steps from S1 to S3 of FIG. 24.

And in the Steps S4 and S5, information which designates the modulation scheme after the changeover should be outputted as the modulation scheme designation information.

Advantage of the Exemplary Embodiment 6

As described above, the radio communication system of this exemplary embodiment has advantages indicated in the following.

In the radio communication system of this exemplary embodiment, when the standard modulation scheme is applied, the target reception level is set to the level higher than the upper limit threshold value of the modulation scheme changeover in the modulation scheme where the modulation multi-level number is smaller than the standard modulation scheme. Therefore, owing to a degradation of the transmission path state, when changing over to the modulation scheme no more than the standard modulation scheme, it functions to control the transmission power from the opposite station to be increased. Accordingly, it is possible to return to the standard modulation scheme without waiting for a recovery of the transmission path state, and has an advantage that the duration of decreasing of the transmission capacity is suppressed to the minimum.

In the radio communication system of this exemplary embodiment applying the highest rank modulation scheme, because the target reception level is set to the level higher than the upper limit threshold value of the modulation scheme changeover while the highest rank modulation scheme is not applied, it functions to control the transmission power from the opposite station to be increased. Accordingly, it is controlled such that the modulation multi-level numbers always shift to a larger modulation scheme, and has an advantage that the transmission capacity can be increased.

In the radio communication system of this exemplary embodiment, information indicating whether the reception level is no less than the target reception level or not is set for each modulation scheme in advance is transmitted from a reception side to a transmission side, and the transmission power is controlled based on that at the transmission side. Therefore, the transmission power designation information does not need to be included in the transmission signal, and has an advantage that the capacity of the payload can be secure in the maximum.

In the radio communication system of this exemplary embodiment, when the standard modulation scheme is applied, the target reception level is set to the middle of the upper limit threshold value and the lower limit threshold value of the modulation scheme changeover in the modulation scheme not less than the standard modulation scheme. Accordingly, it has such advantages that the transmission power is suppressed in minimum and thereby reducing the power consumption of the entire system, while securing the required communication quality.

The above mentioned exemplary embodiment can be combined with other exemplary embodiments respectively by considering its purpose, needed advantages and applications.

While the invention has been particularly shown and described by referring to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2009-214086, filed on Sep. 16, 2009, the disclosure of which is incorporated herein in its entirety by reference.

REFERENCE SIGNS LIST

10: Communication device
20: Transmission signal
30: Reception signal
100, 200 and 300: Radio transceiver
108, 208 and 310: Antenna
110, 210 and 312: Transmission wireless frame data
111, 211 and 314: Transmission IF signal
112, 212 and 315: Modulation scheme control information
113, 213 and 316: Transmission power designation information
114, 214 and 317: Modulation scheme designation information
115, 215 and 318: Reception modulation scheme control information
116, 216 and 319: Transmission power control information
117, 217 and 320: Reception level information
118, 218 and 321: Reception IF signal
119, 219 and 322: Reception wireless frame data
313: Coded transmission wireless frame data
323: Coded reception wireless frame data
325: Error pulse
326: Reception CNR information

The invention claimed is:

1. A communication device comprising:
a reception unit that receives a signal treated with a setting of a modulation scheme based on a modulation scheme designation information and a controlling of a transmission power based on the transmission power designation information by an external transmitter, demodulating said received signal based on a modulation scheme control information, and outputting a received data;
a reception level measurement unit that measures a signal level of said signal and outputting the reception level;
a reception modulation scheme extraction unit that outputs said modulation scheme control information based on said received data;
a designation information output unit that includes a target reception level setting unit to which the modulation scheme changeover threshold value and the target reception level are set to be correlated with said modulation scheme for outputting said modulation scheme designation information based on a comparison result of said reception level and said modulation scheme changeover threshold value, and outputting said transmission power designation information based on said reception level; and
a transmission unit that transmits said modulation scheme designation information and said transmission power designation information to said transmitter.

2. The communication device according to claim 1, wherein said designation information output unit outputs said transmission power designation information requiring to decrease said transmission power when said reception level is not less than said target reception level, and outputs said transmission power designation information requiring to increase said transmission power when said reception level is less than said target reception level.

3. The communication device according to claim 1, wherein said designation information output unit outputs said modulation scheme designation information requiring a changeover to a first said modulation scheme when said reception level is no smaller than said modulation scheme changeover threshold value, and outputs said modulation scheme designation information requiring a changeover to a second said modulation scheme when said reception level is smaller than said modulation scheme changeover threshold value.

4. The communication device according to claim 1, wherein said modulation scheme designation information designates a modulation scheme which is selected from a plurality of modulation schemes having a rank ranging from a highest rank to a lowest rank.

5. The communication device according to claim 4, wherein said target reception level applied with a third modulation scheme as said modulation scheme is set to be higher than a modulation scheme changeover threshold value that is a reception level when changing over from said third modulation scheme to a fourth modulation scheme which is higher than said third modulation scheme only by one in said ranking.

6. The communication device according to claim 4, wherein said target reception level applied with a third modulation scheme as said modulation scheme is set to be lower than a modulation scheme changeover threshold value that is a reception level when changing over from said third modulation scheme to a fourth modulation scheme which is higher than said third modulation scheme only by one in said ranking.

7. The communication device according to claim 4, wherein said target reception level applied with a third modulation scheme as said modulation scheme is set to be lower than a modulation scheme changeover threshold value during said reception level is decreasing, and said target reception level is set to be higher than said modulation scheme changeover threshold value during said reception level is increasing, wherein said modulation scheme changeover threshold value is a reception level when changing over from said third modulation scheme to a fourth modulation scheme which is higher than said third modulation scheme only by one in said ranking.

8. The communication device according to claim 4, wherein said target reception level applied with a third modulation scheme as said modulation scheme is set to be equal to a modulation scheme changeover threshold value that is a reception level when changing over from said third modulation scheme to a fourth modulation scheme which is higher than said third modulation scheme only by one in said ranking.

9. The communication device according to claim 4, wherein said target reception level applied with a third modulation scheme as said modulation scheme is set to be lower than a first modulation scheme changeover threshold value that is a reception level when changing over from said third modulation scheme to a fourth modulation scheme which is higher than said third modulation scheme only by one in said ranking, and wherein said target reception level applied with a fifth modulation scheme which is lower than said third modulation scheme in said ranking as said modulation scheme is set to be higher than a second modulation scheme changeover threshold value that is a reception level when changing over from said fifth modulation scheme to a sixth modulation scheme which is higher than said fifth modulation scheme only by one in said ranking.

10. The communication device according to claim 4, wherein said ranking is set based on high or low of the respective transmission rates of a plurality of said modulation schemes.

11. The communication device according to claim 4, wherein an order of said ranking is set based on a required reception level so that each of a plurality of said modulation schemes secures a predetermined receiving condition.

12. The communication device according to claim 4, wherein an order of said ranking is set based on a required carrier-to-noise ratio so that each of a plurality of said modulation schemes secures a predetermined receiving condition.

13. A communication system comprising:
a first communication device according to claim 1;
a second communication device comprising:
a second reception unit that receives a second signal treated with a setting of a second modulation scheme based on a second modulation scheme designation information and control of a second transmission power based on a second transmission power designation information by said first communication device, demodulating said received second signal based on a second modulation scheme control information, and outputting a second received data;
a second reception level measurement unit that measures a signal level of said second signal and outputting the second reception level;
a second reception modulation scheme extraction unit that outputs said second modulation scheme control information based on said second received data;
a second designation information output unit that outputs said second transmission power designation information correlated to said second modulation scheme designation information and said second modulation scheme based on said second reception level; and
a second transmission unit that outputs said second modulation scheme designation information and said second transmission power designation information to said second transmitter.

14. A communication control method comprising:
receiving a signal treated with a adaptive modulation and a controlling of a transmission power;
setting a modulation scheme changeover threshold value and the target reception level being correlated with said modulation scheme;
measuring a signal level of said signal;
extracting said modulation scheme designation information for the adaptive modulation based on a comparison result of said signal level and said modulation scheme changeover threshold value;
extracting said transmission power designation information for the controlling of a transmission power based on a comparison result of said signal level and said target reception level; and
transmitting said modulation scheme designation information and said transmission power designation information to a transmission source of said signal.

15. The communication control method according to claim 14, further comprising:
outputting said transmission power designation information requiring to decrease said transmission power when said reception level is not less than said target reception level, and outputting said transmission power designation information requiring to increase said transmission power when said reception level is less than said target reception level.

16. The communication control method according to claim 14, further comprising:
outputting said modulation scheme designation information requiring a changeover to a first said modulation scheme when said reception level is no smaller than said modulation scheme changeover threshold value, and outputting said modulation scheme designation information requiring a changeover to a second said modulation scheme when said reception level is smaller than said modulation scheme changeover threshold value.

17. The communication control method according to claim 14, further comprising:
designating a modulation scheme which is selected from a plurality of modulation schemes having a rank ranging from a highest rank to a lowest rank.

18. The communication control method according to claim 14, further comprising:
extracting a modulation scheme control information; and
demodulating said received signal based on a modulation scheme control information.

\* \* \* \* \*